United States Patent
Nishino

(10) Patent No.: US 8,732,948 B2
(45) Date of Patent: May 27, 2014

(54) METHOD OF MANUFACTURING IMPELLER FOR CENTRIFUGAL BLOWER

(71) Applicant: Daikin Industries, Ltd., Osaka (JP)

(72) Inventor: Hisanori Nishino, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 13/918,442

(22) Filed: Jun. 14, 2013

(65) Prior Publication Data

US 2013/0276303 A1  Oct. 24, 2013

Related U.S. Application Data

(62) Division of application No. 12/281,591, filed as application No. PCT/JP2007/054235 on Mar. 6, 2007, now abandoned.

(30) Foreign Application Priority Data

Mar. 8, 2006  (JP) .................................. 2006-062095

(51) Int. Cl.
  *B21K 1/36*  (2006.01)
  *B23P 15/04*  (2006.01)
  *B29C 65/16*  (2006.01)
  *F01D 5/30*  (2006.01)

(52) U.S. Cl.
  USPC ..................... 29/889.21; 29/889.3; 156/272.8

(58) Field of Classification Search
  CPC ........ B21K 1/36; B21K 25/00; B23P 15/006; F01D 5/3061; F01D 5/3069; B29C 65/16
  USPC .................. 29/889, 889.21, 889.3; 156/272.8
  See application file for complete search history.

(56) References Cited

U.S. PATENT DOCUMENTS

| | | | |
|---|---|---|---|
| 2,916,199 A | 12/1959 | Loehr | |
| 3,144,204 A | 8/1964 | Bohanon | |
| 3,536,416 A | 10/1970 | Glucksman | |
| 3,856,434 A | 12/1974 | Hoffmann | |
| 4,874,293 A | 10/1989 | Gutzwiller | |
| 5,511,949 A * | 4/1996 | Thore | ........................ 416/213 R |
| 7,370,787 B2 * | 5/2008 | Bacon et al. | ................ 228/112.1 |

(Continued)

FOREIGN PATENT DOCUMENTS

| | | |
|---|---|---|
| JP | 50-45445 A | 4/1975 |
| WO | 2005/052377 A1 | 6/2005 |

*Primary Examiner* — David Bryant
*Assistant Examiner* — Jason L Vaughan
(74) *Attorney, Agent, or Firm* — Global IP Counselors

(57) ABSTRACT

A resinous blade-supporting rotator is prepared to rotate around a rotational axis. The blade-supporting rotator has rotator weld parts including rotator weld surfaces formed on one side surface in the axial direction. A plurality of resinous blades are disposed annularly around the axis. The plurality of resinous blades have hollow spaces formed in the blade interiors, and blade weld parts with blade weld surfaces. The blade weld surfaces and the rotator weld surfaces are inclined with respect to each other when facing each other in the axial direction. An axial pressure load is applied to opposite axial ends of the blade-supporting rotator so as to compress the blades in the axial direction such that the blade weld surfaces and the rotator weld surfaces are no longer inclined with respect to each other. The blade weld surfaces are fixed to the rotator weld surfaces by laser welding.

12 Claims, 21 Drawing Sheets

(56) References Cited

U.S. PATENT DOCUMENTS

| | | |
|---|---|---|
| 8,007,240 B2 | 8/2011 | Sanagi et al. |
| 8,167,596 B2 * | 5/2012 | Kishikawa et al. ........... 418/179 |
| 8,426,766 B2 * | 4/2013 | Tsukamoto et al. ..... 219/121.63 |
| 2002/0051707 A1 | 5/2002 | Takahashi et al. |
| 2004/0089641 A1 | 5/2004 | Launais et al. |
| 2004/0089646 A1 | 5/2004 | Ditzel et al. |
| 2004/0158984 A1 * | 8/2004 | Lundgren ................. 29/889.21 |
| 2006/0021220 A1 * | 2/2006 | Sato et al. ................. 29/889.21 |

* cited by examiner

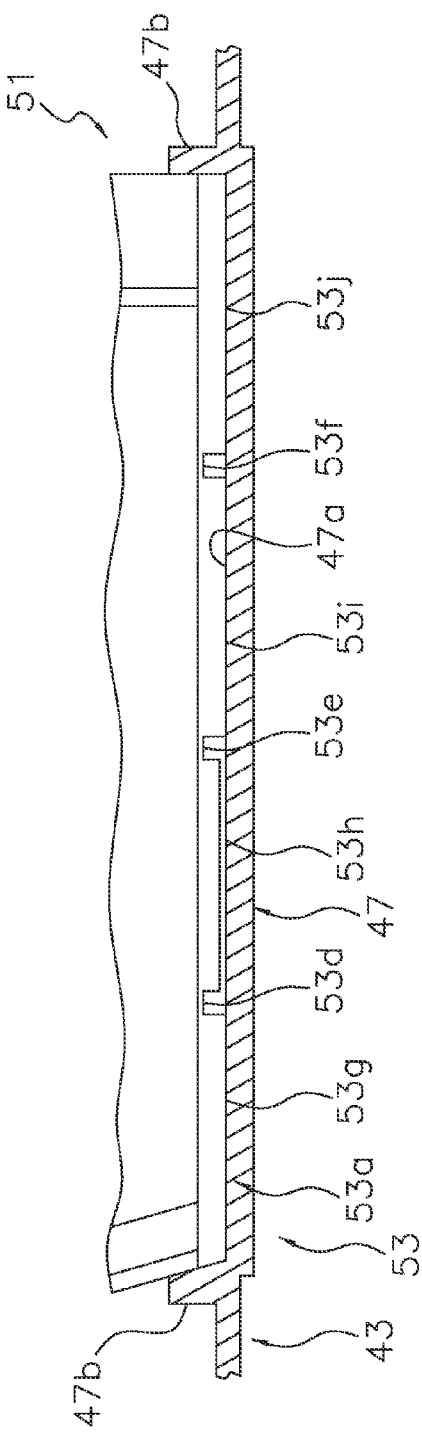
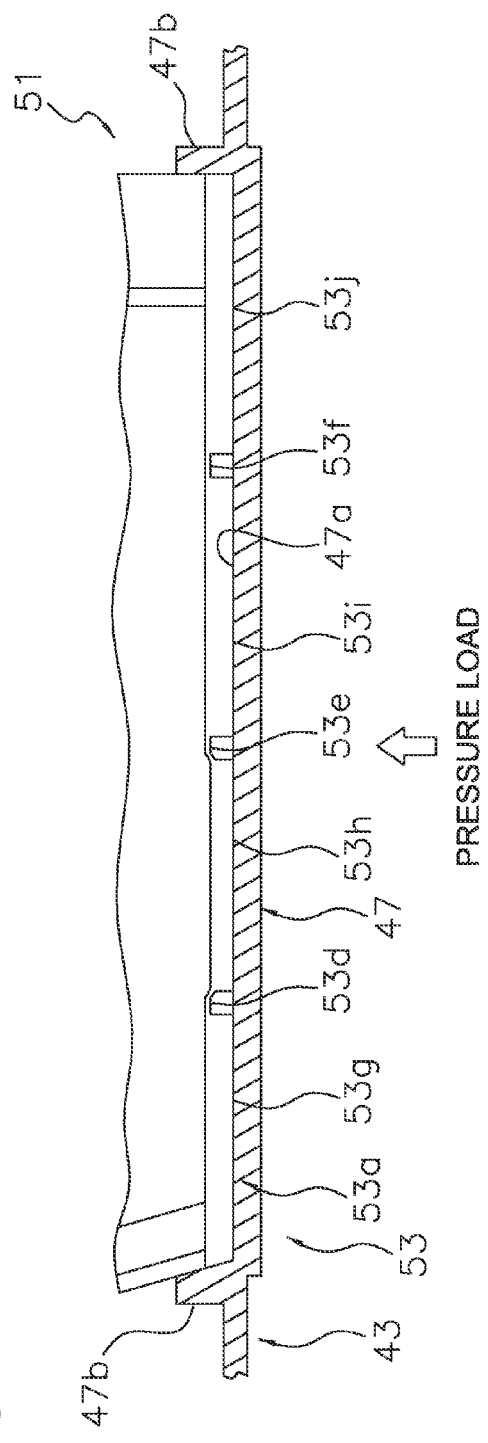
FIG. 20(a)
FIG. 20(b)

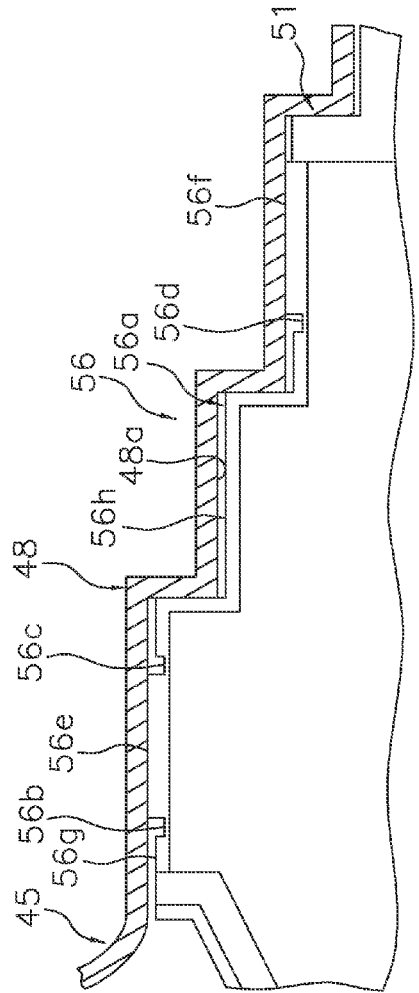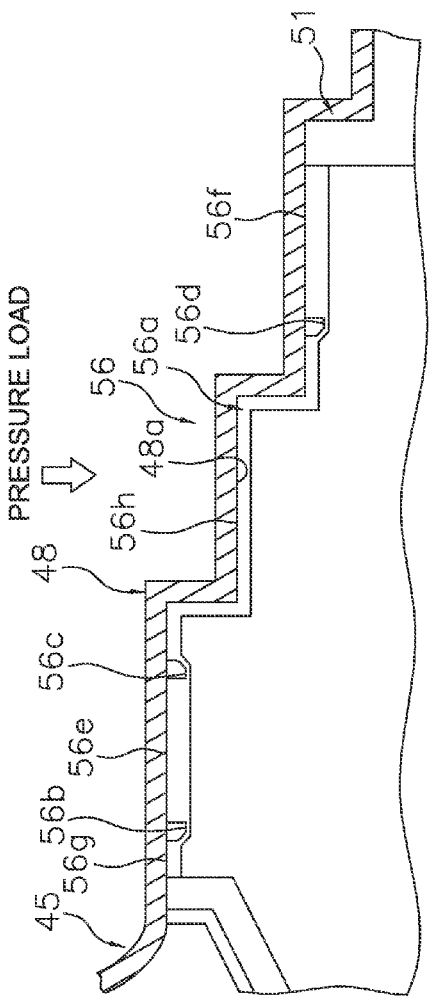
FIG. 21(a)
FIG. 21(b)

METHOD OF MANUFACTURING IMPELLER FOR CENTRIFUGAL BLOWER

CROSS-REFERENCE TO RELATED APPLICATIONS

This application is a divisional application of U.S. patent application Ser. No. 12/281,591 filed on Sep. 3, 2008, which is a National Stage application of International Patent Application No. PCT/JP2007/054235 filed on Mar. 6, 2007, which claims priority under 35 U.S.C. §119(a) to Japanese Patent Application No. 2006-062095 filed in Japan on Mar. 8, 2006, the entire contents of which are hereby incorporated herein by reference.

BACKGROUND OF THE INVENTION

1. Field of the Invention

The present invention relates to an impeller blade for a centrifugal blower, a blade-supporting rotator, an impeller for a centrifugal blower, and a method for manufacturing an impeller for a centrifugal blower. The present invention particularly relates to an impeller blade for a centrifugal blower, a blade-supporting rotator, an impeller for a centrifugal blower, and a method for manufacturing an impeller for a centrifugal blower wherein the centrifugal blower is configured by fixing resinous blades having hollow spaces formed in interiors thereof to a resinous blade-supporting rotator by laser welding.

2. Background Information

Conventionally, turbofans, diagonal-flow fans, and other such centrifugal blowers have been used in ventilation apparatuses, air conditioning apparatuses, air purifiers, and the like. An impeller for this type of centrifugal blower comprises a resinous end plate rotated around a rotational axis by a motor or another such drive mechanism, a plurality of resinous blades having hollow spaces formed in interiors thereof, and a resinous end ring disposed so as to sandwich the blades between the axial direction of the ring and the axial direction of the end plate, as shown in Japanese Laid-open Patent Application No. 2005-155510. The hollow spaces in the blades are formed by attaching two plate-shaped members together, and the blades are fixed to the end plate or the end ring by laser welding.

SUMMARY

In cases in which a structure is used in which resinous blades having hollow spaces formed in interiors thereof are fixed to a resinous end plate or a resinous end ring by laser welding as described above, adherence is important between the weld surfaces of the blades and the weld surface of the end plate, or between the weld surfaces of the blades and the weld surface of the end ring. If adherence between the weld surfaces of the members is insufficient and large gaps form between the weld surfaces, cases may arise in which sufficient welding strength is not achieved.

For example, in blades, end plates, or end rings molded from a resin, unevenness form to some degree in the weld surfaces of the members depending on the finishing precision during resin molding, and cases arise in which the gaps between the weld surfaces of the members become large depending on the unevenness, and sufficient welding strength is not achieved.

When laser welding is performed, a load is imposed to press the end plate and the blades each other in the axial direction, or a load is imposed to press the end ring and the blades each other in the axial direction in order to achieve satisfactory adherence between the weld surfaces of the blades and the weld surface of the end plate, or between the weld surfaces of the blades and the weld surface of the end ring. At this time, however, in cases in which the blades are thin or the blades have a complex rounded shape such that the axially central portions of the blades protrude in the radial direction of the impeller, the blades bend due to a load axially compressing the blades when the aforementioned pressure load is imposed, whereby cases arise in which large gaps form between the weld surfaces of the blades and the weld surface of the end plate, or between the weld surfaces of the blades and the weld surface of the end ring, and sufficient welding strength cannot be achieved.

Thus, in cases in which a structure is used in which resinous hollow blades are fixed by laser welding to a blade-supporting rotator such as a resinous end plate or a resinous end ring, it is difficult to achieve "adherence between the weld surfaces of the members," which has a great affect on welding strength, and as a result, cases may arise in which sufficient welding strength is not achieved. This tendency becomes greater particularly in cases in which the blades are given a complex rounded shape in order to improve blowing performance or noise quality, or in cases in which the blades are thinned in order to reduce the weight of the impeller.

An object of the present invention is to ensure that adherence is satisfactory between the weld surfaces of blades and the weld surface of a blade-supporting rotator, and that welding strength is achieved in a stable manner, in an impeller for a centrifugal blower configured by using laser welding to fix resinous blades having hollow spaces formed in interiors thereof to a resinous blade-supporting rotator.

The impeller blade for a centrifugal blower according to a first aspect is an impeller blade for a centrifugal blower in which a plurality of blades are arranged annularly around a rotational axis of a resinous blade-supporting rotator which rotates around the axis, the blades being fixed by laser welding to rotator weld surfaces formed on one side surface in the axial direction of the blade-supporting rotator, wherein the impeller blade is a resinous hollow blade having blade weld part welded to the rotator weld surface at one end, a hollow space being formed in the blade interior; and a blade weld surface inclined with respect to the rotator weld surface is formed in the blade weld part in a state in which the blade weld part is disposed to face the rotator weld surface in the axial direction.

With this impeller blade for a centrifugal blower, when a load is applied so as to press the blade-supporting rotator and the blade each other in the axial direction as the blade is fixed by laser welding to the blade-supporting rotators, the portion in proximity to the rotator weld surface formed by the inclining of the blade weld surface is firmly pressed into the rotator weld surface in a state in which the blade weld part is disposed to face the rotator weld surface in the axial direction. As a result, the adherence between the blade weld surface and the rotator weld surface is satisfactory, and the blade can therefore be fixed to the blade-supporting rotator with high welding strength.

With this impeller blade for a centrifugal blower, it is thereby possible to achieve satisfactory adherence between the blade weld surface of the blade and the rotator weld surface of the blade-supporting rotator, and to achieve welding strength in a stable manner, even in cases in which unevenness is formed in the weld surface due to the finishing precision during resin molding of the blade and the blade-supporting rotator. In cases in which the blade is given a complex rounded shape in order to improve blowing performance or noise quality or in cases in which the blade is thinned in order to reduce the weight of the impeller, when the pressure load such as is described above is applied, the load compressing the blade in the axial direction is applied, causing the blades to bend, and there is a danger that a gap will increase between the blade weld surface of the blade and the rotator weld surface of the blade-supporting rotator. However, with this impeller blade for a centrifugal blower, the pressure load can be concentrated in the portion in proximity to the rotator weld surface formed by the inclining of the blade weld surface. Therefore, the pressure load applied between the blade and the blade-supporting rotator can be reduced in comparison with cases in which an attempt is made to firmly adhere the entire un-inclined blade weld surface to the entire rotator weld surface of the blade-supporting rotator. There is thereby less danger that the gap will increase between the blade weld surface of the blade and the rotator weld surface of the blade-supporting rotator. It is also possible to achieve satisfactory adherence between the blade weld surface of the blade and the rotator weld surface of the blade-supporting rotator, and the welding strength can be achieved in a stable manner.

The impeller blade for a centrifugal blower according to a second aspect is the impeller blade for a centrifugal blower according to the first aspect, wherein the blade weld surface is configured to be inclined at an angle of 0.5 degrees to 2.5 degrees with respect to the rotator weld surface.

With this impeller blade for a centrifugal blower, since the angles of inclination of the blade weld surface with respect to the rotator weld surface is 0.5 degrees or more, the gap that may form between the blade weld surface of the blade and the rotator weld surface of the blade-supporting rotator can be reduced by applying the pressure load between the blade-supporting rotator and the blade in the axial direction, and an operation for firmly adhering the weld surface together can be reliably achieved. Moreover, since the angles of inclination of the blade weld surface with respect to the rotator weld surface is 2.5 degrees or less, it is possible to reduce the gap that may form between the blade weld surface of the blade and the rotator weld surface of the blade-supporting rotator without the orientation of the blade being greatly changed by the angles of inclination, and the operation for firmly adhering the weld surface together can be achieved.

Thus, with this impeller blade for a centrifugal blower, it is possible to achieve the operation for reducing the gap that may form between the blade weld surface of the blade and the rotator weld surface of the blade-supporting rotator in a reliable manner, without the orientation of the blade being greatly changed by the angles of inclination.

The impeller blade for a centrifugal blower according to a third aspect is the impeller blade for a centrifugal blower according to the first or second aspect, wherein the blade weld surface is inclined so as to be closer to the rotator weld surface as the blade weld surface is oriented in a direction substantially opposite a direction in which an axially central portion of the blade protrudes orthogonally in the axial direction by bending the blade during application of an axially compressing load.

With this impeller blade for a centrifugal blower, when the pressure load is applied in the axial direction between the blade-supporting rotator and the blade as the blade is fixed by laser welding to the blade-supporting rotator, the axially compressing load is applied to the blade, the blade bends, and the axially central portion of the blade protrudes orthogonally in the axial direction. Therefore, the portion of the blade weld part on the side substantially opposite the side in which the axially central portion of the blade protrudes orthogonally in the axial direction is thereby inclined in a direction aparting from the axial direction with respect to the rotator weld surface, and the gap between the blade weld surface and the rotator weld surface tends to increase. However, with this impeller blade for a centrifugal blower, the blade weld surface is inclined so as to be closer to the rotator weld surface as the blade weld surface is oriented in the direction substantially opposite the direction in which the axially central portion of the blade protrudes orthogonally in the axial direction by bending the blade. Therefore, it is possible to maintain a state in which the gap is small between the rotator weld surface of the blade-supporting rotator, and the portion in the blade weld surface of the blade on the side substantially opposite to the side in which the axially central portion of the blade protrudes orthogonally in the axial direction. It is also possible to achieve satisfactory adherence between the blade weld surface of the blade and the rotator weld surface of the blade-supporting rotator, and the welding strength can be achieved in a stable manner.

The impeller blade for a centrifugal blower according to a fourth aspect is the impeller blade for a centrifugal blower according to any of the first through third aspects, wherein the impeller blade includes a first blade surface part, and a second blade surface part attached to the first blade surface part to form the hollow space with the first blade surface part. The blade weld part is formed so as to extend from the blade-supporting rotator side end of the first blade surface part toward the second blade surface part. The blade weld surface is configured to be inclined so as to be closer to the rotator weld surface as the blade weld surface is oriented toward the second blade surface part.

The impeller blade for a centrifugal blower is configured by attaching the second blade surface part to the first blade surface part, wherein the blade weld part is formed so as to extend from the blade-supporting rotator side end of the first blade surface part toward the second blade surface part. Therefore, when the pressure load is applied in the axial direction between the blade-supporting rotator and the blade as the blade is fixed by laser welding to the blade-supporting rotator, the portion of the blade weld part near the second blade surface part, which is less rigid than the portion near the first blade surface part, is inclined in the axial direction away from the rotator weld surface, and the gap between the blade weld surface and the rotator weld surface tends to increase. However, with this impeller blade for a centrifugal blower, since the blade weld surface is inclined so as to be closer to the rotator weld surface as the blade weld surface is oriented toward the second blade surface part, it is possible to maintain a state in which the gap is small between the portion of the blade weld surface of the blade near the second blade surface part and the rotator weld surface of the blade-supporting rotator. It is also possible to achieve satisfactory adherence between the blade weld surface of the blade and the rotator weld surface of the blade-supporting rotator, and the welding strength can be achieved in a stable manner.

The impeller blade for a centrifugal blower according to a fifth aspect is the impeller blade for a centrifugal blower according to any of the first through fourth aspects, wherein a groove or slit is formed in the blade weld part.

With this impeller blade for a centrifugal blower, in cases in which unevenness occurs in each of the weld surfaces due to the finishing precision during resin molding of the blade and the blade-supporting rotator, merely providing an incline to the blade weld surfaces gives rise to the danger that there will still be portions in which it is impossible to reduce the gap between the blade weld surface of the blade and the rotator weld surface of the blade-supporting rotator. However, with this impeller blade for a centrifugal blower, the groove or slit is formed in the blade weld part, whereby each of the portions of the blade weld part partitioned by the groove or slit is able to move as separate portions in the axial direction, with the groove or slit acting as a boundary. Therefore, it is possible to reduce the danger that there will still be portions in which it is impossible to reduce the gap between the blade weld surface of the blade and the rotator weld surface of the blade-supporting rotator. It is also possible to achieve satisfactory adherence between the blade weld surface of the blade and the rotator weld surface of the blade-supporting rotator, and the welding strength can be achieved in a stable manner. In cases in which the blade is made to bend by the application of the pressure load in the axial direction between the blade-supporting rotator and the blade as the blade is fixed by laser welding to the blade-supporting rotator, such as cases in which the blade is given a complex rounded shape in order to improve blowing performance or noise quality, or cases in which the blade is thinned in order to reduce the weight of the impeller, there may be portions in which the gap increases between the blade weld surface of the blade and the rotator weld surface of the blade-supporting rotator. Therefore, merely providing an incline to the blade weld surface gives rise to the danger that there will still be portions in which it is impossible to reduce the gap between the blade weld surface of the blade and the rotator weld surface of the blade-supporting rotator. However, the groove or slit is formed in the blade weld part, whereby the each portion of the blade weld part partitioned by the groove or slit is able to function as separate blade weld part, with the groove or slit acting as a boundary. Therefore, it is possible to reduce the danger that there will still be portions in which it is impossible to reduce the gap between the blade weld surface of the blade and the rotator weld surface of the blade-supporting rotator, even in cases in which the blade is made to bend by the application of the pressure load in the axial direction between the blade-supporting rotator and the blade. It is also possible to achieve satisfactory adherence between the blade weld surface of the blade and the rotator weld surface of the blade-supporting rotator, and the welding strength can be achieved in a stable manner.

Thus, with this impeller blade for a centrifugal blower, not only the incline is provided to the blade weld surfaces, but also the groove or slit is formed in the blade weld part, and it is therefore possible to reduce the danger that there will still be portions in which it is impossible to reduce the gap between the blade weld surface of the blade and the rotator weld surface of the blade-supporting rotator. It is also possible to achieve satisfactory adherence between the blade weld surface of the blade and the rotator weld surface of the blade-supporting rotator, and the welding strength can be achieved in a stable manner.

The impeller blade for a centrifugal blower according to a sixth aspect is the impeller blade for a centrifugal blower according to any of the first through fourth aspects, wherein the blade flat surface, which is parallel to a rotator weld surface and which is disposed at positions axially farther away from the rotator weld surface than the portion of the blade weld surface in proximity to the rotator weld surface, is formed in the blade weld part in addition to the blade weld surface so as to be adjacent to the blade weld surface in a state in which the blade weld part is disposed to face the rotator weld surface in the axial direction, and a groove or slit is formed so as to correspond to a boundary between the blade weld surface and the blade flat surface.

With this impeller blade for a centrifugal blower, the blade flat surface, which is parallel to a rotator weld surface and which is disposed at position axially farther away from the rotator weld surface than the portion of the blade weld surfaces in proximity to the rotator weld surface, is formed in the blade weld part in addition to the blade weld surfaces so as to be adjacent to the blade weld surface in a state in which the blade weld part is disposed to face the rotator weld surface in the axial direction, and the groove or slit is formed so as to correspond to the boundary between the blade weld surface and the blade flat surface, whereby the portion corresponding to the blade weld surface of the blade weld part partitioned by the groove or slit and the portion corresponding to the blade flat surfaces is able to move as separate portion in the axial direction, with the groove or slit acting as a boundary. When the pressure load is applied between the blade-supporting rotator and the blade, the pressure load can be reliably concentrated in the portion of the blade weld surface closer to the rotator weld surface than the blade flat surface, because only the portion of the blade weld part corresponding to the blade weld surface is moved axially by the pressure load, and the portion corresponding to the blade flat surface does not move readily in the axial direction. Therefore, when the blade is fixed by laser welding to the blade-supporting rotator, the pressure load applied between the blade-supporting rotator and the blade can be further reduced.

The impeller for a centrifugal blower according to a seventh aspect comprises a blade-supporting rotator and a plurality of the impeller blades for a centrifugal blower according to any of the first through sixth aspects. The blade-supporting rotator is a resinous member that rotates around a rotational axis, and the blade-supporting rotator includes rotator weld parts having a rotator weld surface formed on one side surface in the axial direction. The impeller blades are disposed annularly around the axis of the blade-supporting rotator, and the impeller blades are fixed by laser welding to the rotator weld surfaces.

The impeller for a centrifugal blower is manufactured by using laser welding to fix the blades to the blade-supporting rotator in a state in which the load is applied so as to press the blade-supporting rotator and the blades each other in the axial direction, the blades having blade weld surfaces inclined with respect to the rotator weld surfaces in a state in which the blade weld parts are disposed to face the rotator weld surfaces in the axial direction. The blades are therefore fixed to the blade-supporting rotator with high welding strength. Therefore, with this impeller for a centrifugal blower, when the blades are fixed by laser welding to the blade-supporting rotator, the pressure load applied in the axial direction between the blade-supporting rotator and the blades can be reduced, the length of the laser welded portions can be reduced, the blades can be given a complex rounded shape in order to improve blowing performance and noise quality, the blades can be thinned in order to reduce the weight of the impeller, and, as a result, costs can be reduced.

The blade-supporting rotator of an impeller for a centrifugal blower according to an eighth aspect is blade-supporting rotator of an impeller for a centrifugal blower in which a plurality of resinous blades are disposed on one axial side, the blades being disposed annularly around a rotational axis and having hollow spaces in the blade interiors, and blade weld surfaces formed at one ends of the blades are fixed by laser welding to the blade-supporting rotator; wherein the blade-supporting rotator is a member which have rotator weld parts welded to the blade weld surfaces in the sides near the blades in the axial direction, and which rotate around a rotational axis; and rotator weld surfaces inclined with respect to the blade weld surfaces are formed in the rotator weld parts in a state in which the rotator weld parts are disposed to face the blade weld surfaces in the axial direction.

With this blade-supporting rotator of an impeller for a centrifugal blower, when a load is applied so as to press the blade-supporting rotator and the blades each other in the axial direction as the blades are fixed by laser welding to the blade-supporting rotator, the portions in proximity to the blade weld surfaces formed by the inclining of the rotator weld surfaces are pressed more firmly into the blade weld surfaces than the other portions in a state in which the blade weld parts are disposed to face the blade weld surfaces in the axial direction. As a result, the adherence between the rotator weld surfaces and the blade weld surfaces is satisfactory, and the blades can therefore be fixed to the blade-supporting rotator with high welding strength.

With this blade-supporting rotator of an impeller for a centrifugal blower, it is thereby possible to achieve satisfactory adherence between the blade weld surfaces of the blades and the rotator weld surfaces of the blade-supporting rotators, and to achieve welding strength in a stable manner, even in cases in which unevenness are formed in the weld surfaces due to the finishing precision during resin molding of the blades and the blade-supporting rotator. In cases in which the blades are given a complex rounded shape in order to improve blowing performance or noise quality or in cases in which the blades are thinned in order to reduce the weight of the impeller, when the pressure load such as is described above is applied, the load compressing the blades in the axial direction is applied, causing the blades to bend, and there is a danger that the gaps will increase between the blade weld surfaces of the blades and the rotator weld surfaces of the blade-supporting rotator. However, with this blade-supporting rotator of an impeller for a centrifugal blower, the pressure load can be concentrated in the portions in proximity to the blade weld surfaces formed by the inclining of the rotator weld surfaces. Therefore, the pressure load applied between the blade-supporting rotator and the blades can be reduced in comparison with cases in which an attempt is made to firmly adhere the entire un-inclined rotator weld surfaces to the entire blade weld surfaces of the blades. There is thereby less danger that the gaps will increase between the blade weld surfaces of the blades and the rotator weld surfaces of the blade-supporting rotator. It is also possible to achieve satisfactory adherence between the blade weld surfaces of the blades and the rotator weld surfaces of the blade-supporting rotator, and the welding strength can be achieved in a stable manner.

The blade-supporting rotator of an impeller for a centrifugal blower according to a ninth aspect is the blade-supporting rotator of an impeller for a centrifugal blower according to the eighth aspect, wherein the rotator weld surfaces are configured to be inclined at an angle of 0.5 degrees to 2.5 degrees with respect to the blade weld surfaces.

With this blade-supporting rotator of an impeller for a centrifugal blower, since the angles of inclination of the rotator weld surfaces with respect to the blade weld surfaces are 0.5 degrees or more, the gaps that may form between the blade weld surfaces of the blades and the rotator weld surfaces of the blade-supporting rotator can be reduced by applying the pressure load between the blade-supporting rotator and the blades in the axial direction, and an operation for firmly adhering the weld surfaces together can be reliably achieved. Moreover, since the angles of inclination of the rotator weld surfaces with respect to the blade weld surfaces are 2.5 degrees or less, it is possible to reduce the gaps that may form between the blade weld surfaces of the blades and the rotator weld surfaces of the blade-supporting rotator without the orientations of the blades being greatly changed by the angles of inclination, and the operation for firmly adhering the weld surfaces together can be achieved.

Thus, with this blade-supporting rotator of an impeller for a centrifugal blower, it is possible to achieve the operation for reducing the gaps that may form between the blade weld surfaces of the blades and the rotator weld surfaces of the blade-supporting rotator in a reliable manner, without the orientation of the blades being greatly changed by the angles of inclination.

The blade-supporting rotators of an impeller for a centrifugal blower according to a tenth aspect is the blade-supporting rotator of an impeller for a centrifugal blower according to the eighth or ninth aspect, wherein the rotator weld surfaces are configured to be inclined so as to be closer to the blade weld surfaces as the rotator weld surfaces are oriented in a direction substantially opposite a direction in which axially central portions of the blades protrude orthogonally in the axial direction by bending the blades during application of an axially compressing load.

With this blade-supporting rotator of an impeller for a centrifugal blower, when the pressure load is applied in the axial direction between the blade-supporting rotator and the blades as the blades are fixed by laser welding to the blade-supporting rotator, the axially compressing load is applied to the blades, the blades bend, and the axially central portions of the blades protrude orthogonally in the axial direction. Therefore, the portions of the blade weld parts on the side substantially opposite the side in which the axially central portions of the blades protrude orthogonally in the axial direction are thereby inclined in a direction aparting from the axial direction with respect to the rotator weld surfaces, and the gaps between the blade weld surfaces and the rotator weld surfaces tend to increase. However, with these blade-supporting rotator of an impeller for a centrifugal blower, the rotator weld surfaces are inclined so as to be closer to the blade weld surfaces as the rotator weld surfaces are oriented in a direction substantially opposite a direction in which the axially central portions of the blades protrude orthogonally in the axial direction by bending the blades. Therefore, it is possible to maintain a state in which the gaps are small between the rotator weld surfaces of the blade-supporting rotator, and the portions in the blade weld surfaces of the blades on the sides substantially opposite to the sides in which the axially central portions of the blades protrude orthogonally in the axial direction. It is also possible to achieve satisfactory adherence between the blade weld surfaces of the blades and the rotator weld surfaces of the blade-supporting rotator, and the welding strength can be achieved in a stable manner.

The impeller for a centrifugal blower according to an eleventh aspect comprises a plurality of impeller blades, and blade-supporting rotator according to any of the eighth through tenth aspects. The blades are resinous hollow having hollow spaces in interiors thereof, a plurality of blades being disposed annularly around a rotational axis; and the blades have blade weld parts having blade weld surfaces formed at one ends. The blade-supporting rotator is disposed on the blade weld part sides of the blades, and the blade weld surfaces are fixed to the rotators by laser welding.

The impeller for a centrifugal blower is manufactured by using laser welding to fix the blades to the blade-supporting rotator in a state in which the load is applied so as to press the blade-supporting rotator and the blades each other in the axial direction, the blade-supporting rotator having rotator weld surfaces inclined with respect to the blade weld surfaces in a state in which the rotator weld parts are disposed to face the blade weld surfaces in the axial direction. The blades are therefore fixed to the blade-supporting rotator with high welding strength. Therefore, with this impeller for a centrifugal blower, when the blades are fixed by laser welding to the blade-supporting rotator, the pressure load applied between the blade-supporting rotator and the blades can be reduced, the length of the laser welded portions can be reduced, the blades can be given a complex rounded shape in order to improve blowing performance and noise quality, the blades can be thinned in order to reduce the weight of the impeller, and, as a result, costs can be reduced.

The impeller for a centrifugal blower according to a twelfth aspect is the impeller for a centrifugal blower according to the eleventh aspect, wherein the blades include first blade surface parts, and second blade surface parts attached to the first blade surface parts to form the hollow spaces with the first blade surface parts. The blade weld parts are formed so as to extend from the blade-supporting rotator side ends of the first blade surface parts toward the second blade surface parts. The rotator weld surfaces are inclined so as to be closer to the blade weld surfaces as the rotator weld surfaces are oriented toward the second blade surface parts.

With this impeller for a centrifugal blower, the blades are configured by attaching the second blade surface parts to the first blade surface parts, wherein the blade weld parts are formed so as to extend from the blade-supporting rotator side ends of the first blade surface parts toward the second blade surface parts. Therefore, when the pressure load is applied in the axial direction between the blade-supporting rotator and the blades as the blades are fixed by laser welding to the blade-supporting rotator, the portions of the blade weld parts near the second blade surface parts, which are less rigid than the portions near the first blade surface parts, are inclined in the axial direction away from the rotator weld surfaces, and the gaps between the blade weld surfaces and the rotator weld surfaces tend to increase. However, with this impeller for a centrifugal blower, since the rotator weld surfaces are inclined so as to be closer to the blade weld surfaces as the rotator weld surfaces are oriented toward the second blade surface parts, it is possible to maintain a state in which the gaps are small between the portions of the blade weld surfaces of the blades near the second blade surface parts and the rotator weld surfaces of the blade-supporting rotator. It is also possible to achieve satisfactory adherence between the blade weld surfaces of the blades and the rotator weld surfaces of the blade-supporting rotator, and the welding strength can be achieved in a stable manner.

The impeller for a centrifugal blower according to a thirteenth aspect is the impeller for a centrifugal blower according to the eleventh or twelfth aspect, wherein a groove or slit is formed in each of the blade weld parts.

With this impeller for a centrifugal blower, in cases in which unevenness occur in the each of weld surfaces due to the finishing precision during resin molding of the blades and the blade-supporting rotator, merely providing an incline to the rotator weld surfaces gives rise to the danger that there will still be portions in which it is impossible to reduce the gaps between the blade weld surfaces of the blades and the rotator weld surfaces of the blade-supporting rotator. However, with this impeller for a centrifugal blower, the groove or slit is formed in each of the blade weld parts, whereby each of the portions of the blade weld parts partitioned by the groove or slit is able to move as separate portions in the axial direction, with the groove or slit acting as a boundary. Therefore, it is possible to reduce the danger that there will still be portions in which it is impossible to reduce the gaps between the blade weld surfaces of the blades and the rotator weld surfaces of the blade-supporting rotator. It is also possible to achieve satisfactory adherence between the blade weld surfaces of the blades and the rotator weld surfaces of the blade-supporting rotator, and the welding strength can be achieved in a stable manner. In cases in which the blades are made to bend by the application of the pressure load in the axial direction between the blade-supporting rotator and the blades as the blades are fixed by laser welding to the blade-supporting rotator, such as cases in which the blades are given a complex rounded shape in order to improve blowing performance or noise quality, or cases in which the blades are thinned in order to reduce the weight of the impeller, there may be portions in which the gaps increase between the blade weld surfaces of the blades and the rotator weld surfaces of the blade-supporting rotator. Therefore, merely providing an incline to the rotator weld surfaces gives rise to the danger that there will still be portions in which it is impossible to reduce the gaps between the blade weld surfaces of the blades and the rotator weld surfaces of the blade-supporting rotator. However, the groove or slit is formed in each of the blade weld parts, whereby each of the portions of the blade weld parts partitioned by the groove or slit is able to function as separate blade weld parts, with the groove or slit acting as a boundary. Therefore, it is possible to reduce the danger that there will still be portions in which it is impossible to reduce the gaps between the blade weld surfaces of the blades and the rotator weld surfaces of the blade-supporting rotator even in cases in which the blades are made to bend by the application of the pressure load in the axial direction between the blade-supporting rotator and the blades. It is also possible to achieve satisfactory adherence between the blade weld surfaces of the blades and the rotator weld surfaces of the blade-supporting rotator, and the welding strength can be achieved in a stable manner.

Thus, with this impeller for a centrifugal blower, not only is the incline provided to each of the rotator weld surfaces, but also the groove or slit is formed in each of the blade weld parts, and it is therefore possible to reduce the danger that there will still be portions in which it is impossible to reduce the gaps between the blade weld surfaces of the blades and the rotator weld surfaces of the blade-supporting rotator. It is also possible to achieve satisfactory adherence between the blade weld surfaces of the blades and the rotator weld surfaces of the blade-supporting rotator, and the welding strength can be achieved in a stable manner.

The method for manufacturing an impeller for a centrifugal blower according to a fifteenth aspect is a method for manufacturing an impeller for a centrifugal blower comprising resinous blade-supporting rotators which rotate around a rotational axis, and a plurality of resinous blades disposed annularly around the axis, the blades having hollow spaces formed in the blade interiors; wherein the blade-supporting rotators have rotator weld parts on the surface of one axial side, rotator weld surfaces being formed on the rotator weld parts; the blades have blade weld parts on which are formed blade weld surfaces inclined with respect to the rotator weld surfaces in a state in which the ends of the blades near the blade-supporting rotators are disposed opposite, relative to the axial direction, the rotator weld surfaces; and the blade weld parts are disposed opposite, relative to the axial direction, the rotator weld surfaces, and the blades are fixed to the rotator weld surfaces by laser welding.

With this method for manufacturing an impeller for a centrifugal blower, the blades, on which are formed blade weld surfaces inclined with respect to the rotator weld surfaces in a state in which the blade weld parts are disposed to face the rotator weld surfaces in the axial direction, are fixed by laser welding to the blade-supporting rotators in a state in which a load is applied so as to press the blade-supporting rotators and the blades each other in the axial direction. Therefore, it is possible to obtain an impeller for a centrifugal blower in which the blades are fixed to the blade-supporting rotators with high welding strength. Therefore, with this method for manufacturing an impeller for a centrifugal blower, when the blades are fixed by laser welding to the blade-supporting rotator, the pressure load applied between the blade-supporting rotator and the blades can be reduced, the length of the laser welded portions can be reduced, the blades can be given a complex rounded shape in order to improve blowing performance and noise quality, the blades can be thinned in order to reduce the weight of the impeller, and, as a result, costs can be reduced.

BRIEF DESCRIPTION OF THE DRAWINGS

FIGS. 20(a) and 20(b) show the state in which a first blade weld part moves in the axial direction when a pressure load is applied to the end plate in a case in which the gap between one part of the first blade weld surface and the plate weld surface is larger than the gaps between the other first blade weld surfaces and the plate weld surface; wherein FIG. 20(a) shows the state in which the blade is disposed at a specific position in the end plate, and FIG. 20(b) shows the state in which a load is applied to the end plate.

FIGS. 21(a) and 21(b) show the state in which a second blade weld part moves in the axial direction when a pressure load is applied to the end ring, wherein FIG. 21(a) shows the state in which the blade is disposed at a specific position in the end ring, and FIG. 21(b) shows the state in which the load is applied to the end ring.

DETAILED DESCRIPTION OF EMBODIMENTS

The following is a description, made with reference to the drawings, of an embodiment of an impeller blade for a centrifugal blower, a blade-supporting rotator, an impeller for a centrifugal blower, and a method for manufacturing an impeller for a centrifugal blower according to the present invention.

(1) Overall Configuration of Air Conditioning Apparatus

Figure 1:
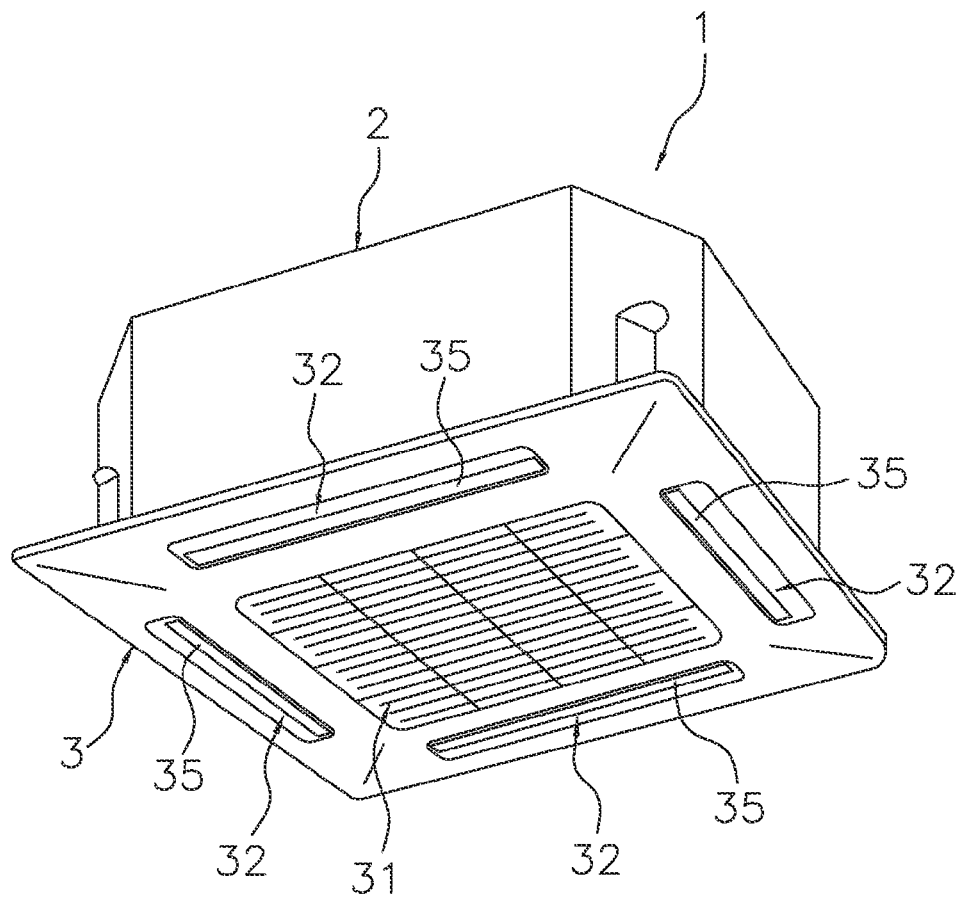
FIG. 1 is an external perspective view of an air conditioning apparatus comprising a centrifugal blower that uses blades, blade-supporting rotators, and an impeller for a centrifugal blower according to one embodiment of the present invention.
Figure 2:
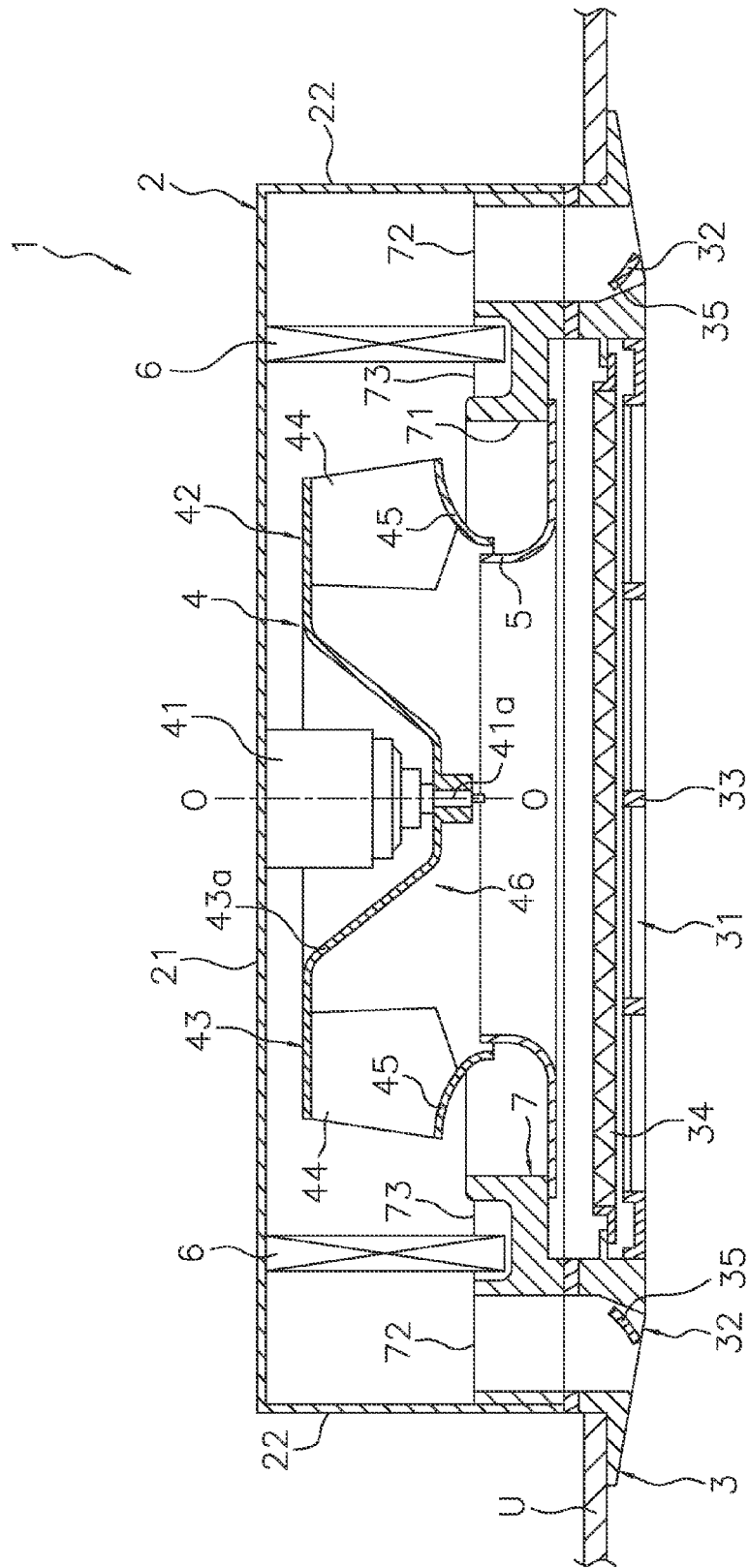
FIG. 2 is a schematic cross-sectional side view of the air conditioning apparatus.

FIG. 1 shows an external perspective view of an air conditioning apparatus 1 comprising a centrifugal blower that uses a blade, a blade-supporting rotator, and an impeller for a centrifugal blower according to one embodiment of the present invention (the ceiling is omitted). The air conditioning apparatus 1 is a ceiling-embedded air conditioning apparatus, and comprises a casing 2 for accommodating various structural devices in its interior, and a face panel 3 disposed on the underside of the casing 2. Specifically, the casing 2 of the air conditioning apparatus 1 is disposed by being inserted into an opening formed in a ceiling U of an air-conditioned room, as shown in FIG. 2 (a schematic cross-sectional side view of the air conditioning apparatus 1). The face panel 3 is disposed so as to fit into the opening in the ceiling U.

In a plan view, the casing 2 is shaped as a box in which the bottom surface of the substantially octagonal in the plan view is open, the long sides and short sides thereof being formed alternately. The casing has a substantially octagonal top plate 21 in which long sides and short sides are formed alternately, and side plates 22 extending downward from the peripheral edges of the top plate 21.

The face panel 3 is a substantially square plate-shaped member in a plan view, and has an intake port 31 in the substantial center for drawing in air in the air-conditioned room, and a plurality (four in the present embodiment) of discharge ports 32 formed so as to correspond to the four sides for blowing air out of the casing into the air-conditioned room. The sides of the face panel 3 are disposed so as to correspond to the long sides of the top plate 21 of the casing 2. The intake port 31 is a substantially square-shaped opening in the present embodiment. The four discharge ports 32 are substantially rectangular openings extending in an elongated manner along the respective sides of the face panel 3. The intake port 31 is provided with an intake grill 33, and a filter 34 for removing dust in the air drawn in through the intake port 31. The discharge ports 32 are each provided with horizontal flaps 35 capable of swinging around a longitudinal axis, making it possible to change the direction of the flow of air blown out through the discharge ports 32 into the air-conditioned room.

Disposed inside the casing 2 are primarily a blower 4 for drawing air in the air-conditioned room into the casing 2 through the intake port 31 of the face panel 3 and blowing the air peripherally outward, and a heat exchanger 6 disposed so as to enclose the external periphery of the blower 4.

In the present embodiment, the blower 4 is a turbofan as one example of a centrifugal blower, and the blower 4 has a fan motor 41 provided in the center of the top plate 21 of the casing 2, and an impeller 42 (an impeller for a centrifugal blower) linked to and rotatably driven by a shaft 41a (rotating shaft) of the fan motor 41. The detailed structure of the impeller 42 is described hereinafter.

In the present embodiment, the heat exchanger 6 is a cross-fin tube type heat exchange panel that is bent and formed so as to enclose the external periphery of the blower 4, and is connected via a refrigerant pipe to an outdoor unit (not shown) installed outside of the room or another such location. The heat exchanger 6 is designed to be capable of functioning as an evaporator during the cooling operation and as a condenser during the heating operation. The heat exchanger 6 is thereby capable of performing heat exchange with the air drawn into the casing 2 through the intake port 31 by the blower 4, of cooling the air during the cooling operation, and of heating the air during the heating operation.

Disposed beneath the heat exchanger 6 is a drain pan 7 for receiving drain water produced by the moisture in the air condensing in the heat exchanger 6. The drain pan 7 is installed at the bottom of the casing 2. The drain pan 7 has an intake hole 71 formed so as to communicate with the intake port 31 of the face panel 3, discharge holes 72 formed so as to correspond with the discharge ports 32 of the face panel 3, and a drain water receiving groove 73 formed beneath the heat exchanger 6 for receiving drain water.

Disposed in the intake hole 71 of the drain pan 7 is a bell mouth 5 for guiding air taken in through the intake port 31 to the impeller 42 of the blower 4.

As described above, an air flow channel is formed in the air conditioning apparatus 1, starting from the intake port 31 of the face panel 3, running through the filter 34, the bell mouth 5, the drain pan 7, the blower 4, and the heat exchanger 6, and ending at the four discharge ports 32. Air in the air-conditioned room is drawn in and made to exchange heat in the heat exchanger 6, and the air can then be blown out into the air-conditioned room.

Figure 3:
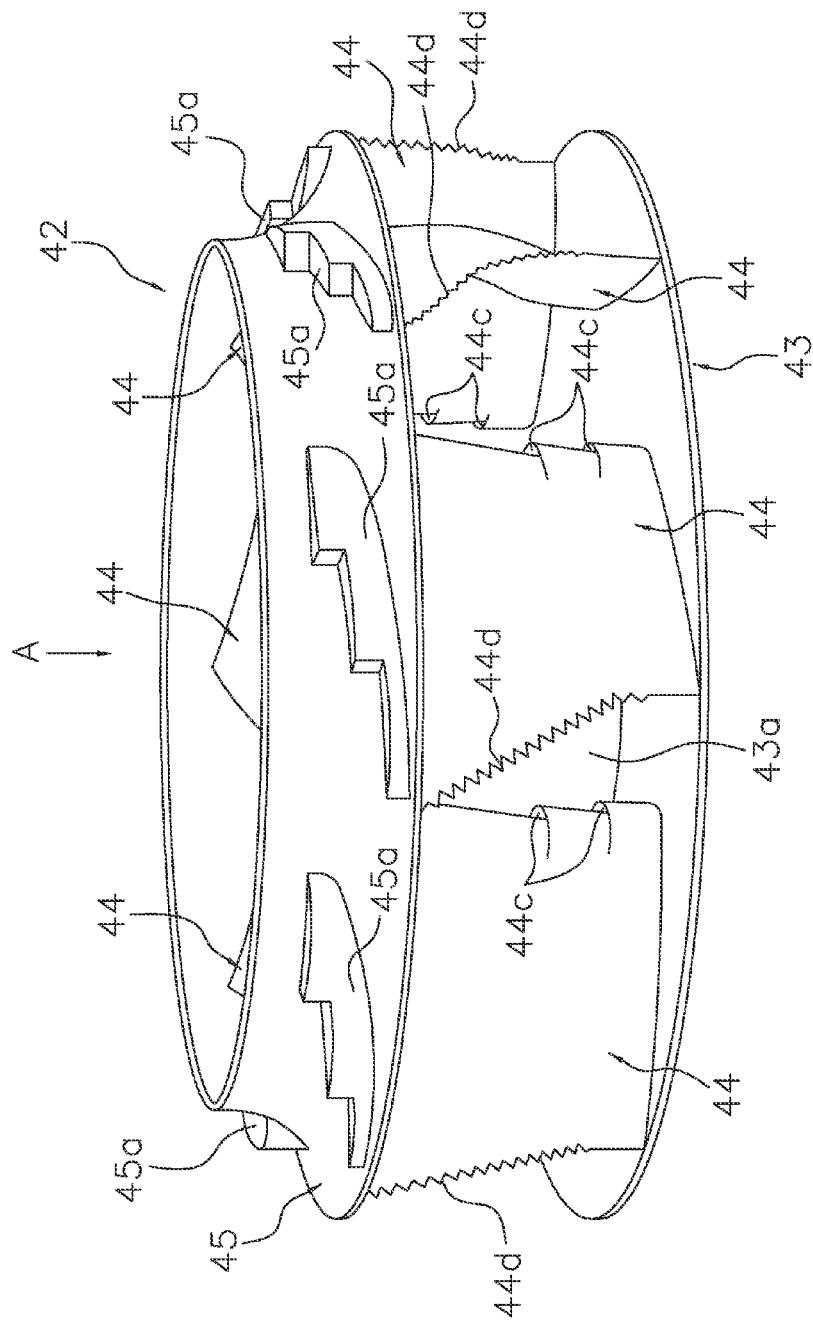
FIG. 3 is an external perspective view of the impeller.
Figure 4:
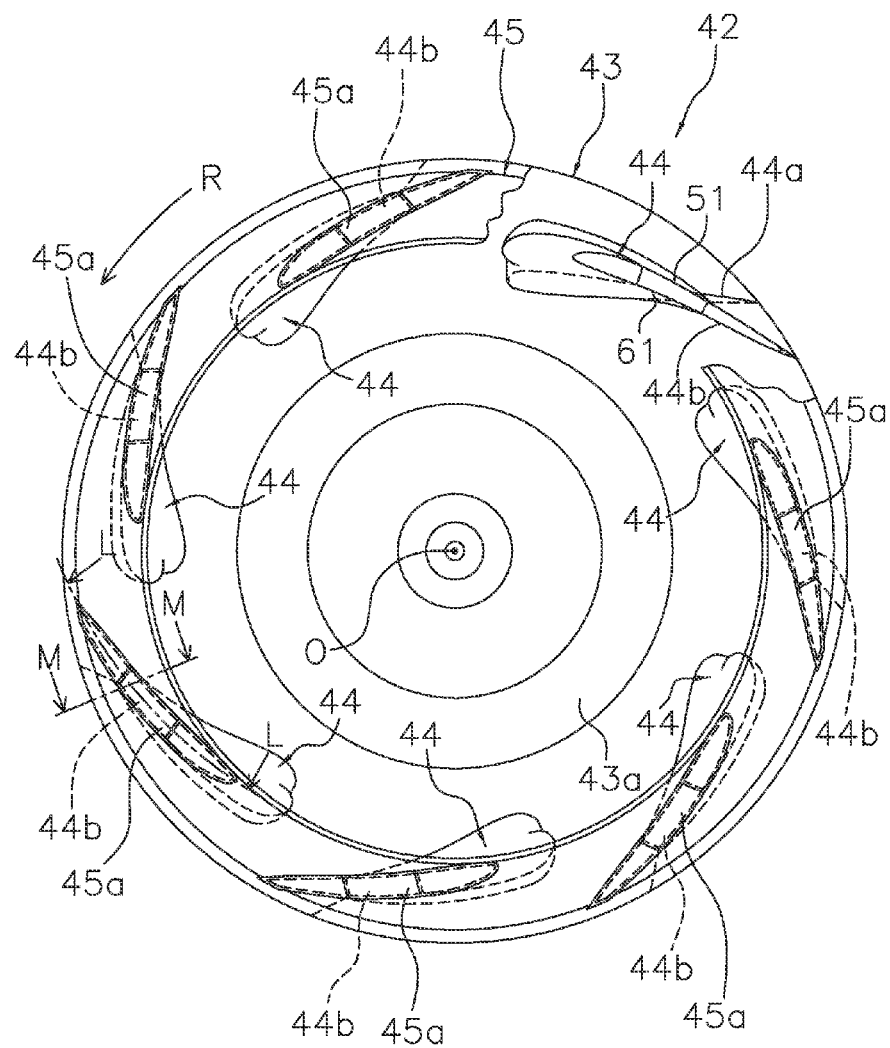
FIG. 4 is a view as indicated by the arrow A in FIG. 3 (excluding part of an end ring).

(2) General Structure of Impeller; and Structure of Blades, End Plate, and End Ring Constituting Impeller Next, the general structure of the impeller 42 will be described using FIGS. 2, 3, and 4. FIG. 3 is an external perspective view of the impeller 42. FIG. 4 is a view as indicated by the arrow A in FIG. 3 (excluding part of an end ring 45).

The impeller 42 primarily has a discoid end plate 43 as a blade-supporting rotator linked to the shaft 41a of the fan motor 41, a plurality (seven in the present embodiment) of blades 44 centered around the shaft 41a and arranged annularly on the side of the end plate 43 opposite the fan motor 41, and an annular end ring 45 as a blade-supporting rotator disposed so as to sandwich the blades 44 with the end plate 43 in the axial direction. The center axis line of the shaft 41a (i.e., the rotational axis line of the impeller 42) is indicated by O-O, and the rotational direction of the impeller 42 is indicated by R.

Next, the general structure of the end plate 43 and the end ring 45 as blade-supporting rotators will be described.

The end plate 43 is a substantially discoid resinous member formed so that a substantially conical convex part 43a in the center protrudes toward the intake port 31.

The end ring 45 is an annular bell-shaped resinous member in which areas farther away from the external periphery and closer to the opening in the central part protrude closer toward the intake port 31.

Figure 5:
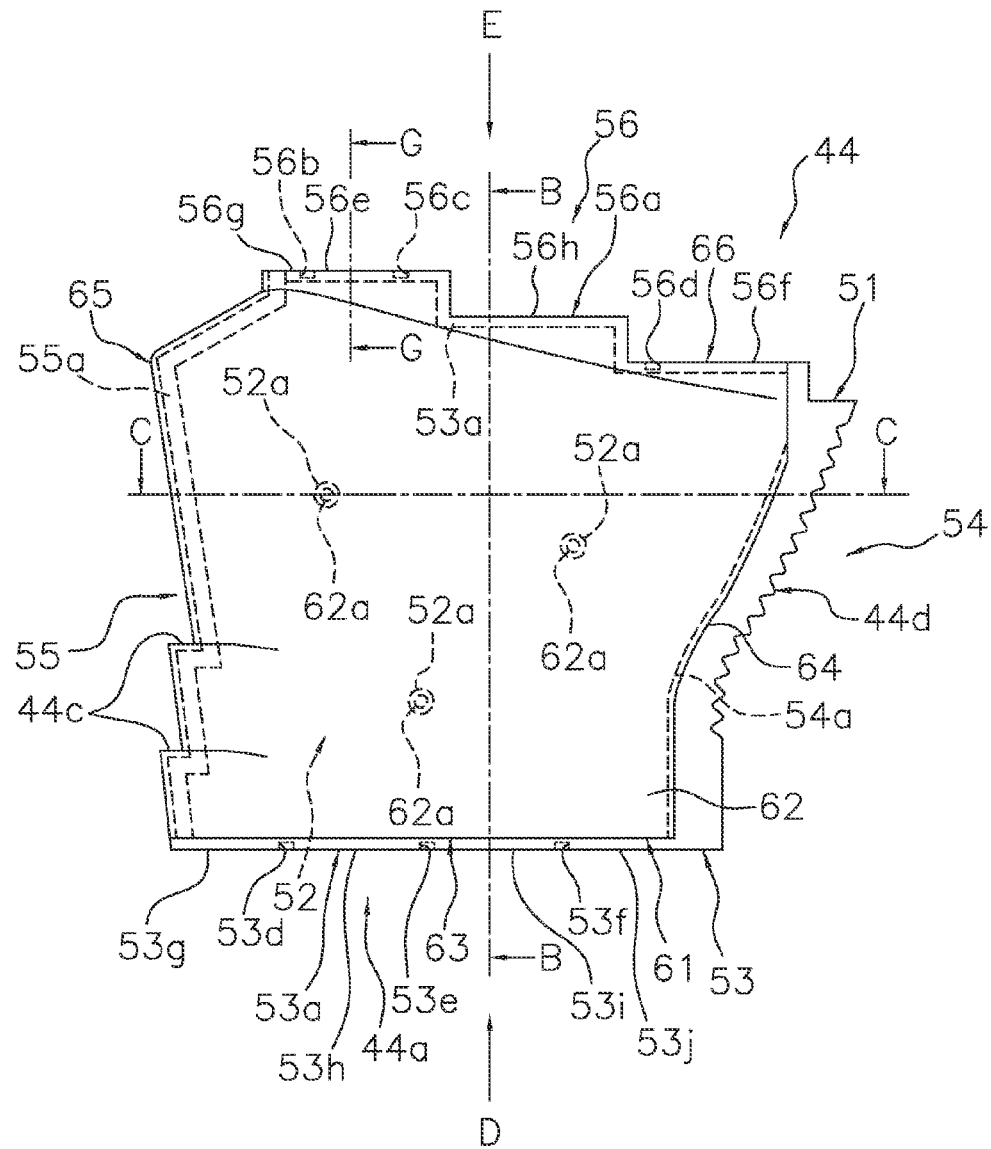
FIG. 5 is a schematic side view of the blade.
Figure 6:
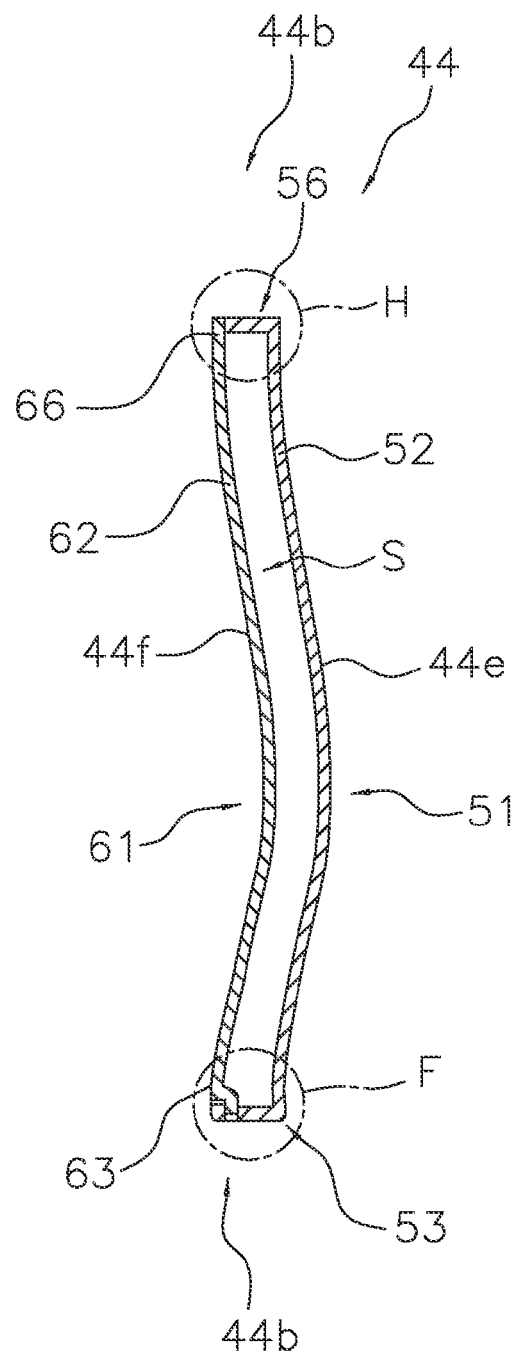
FIG. 6 is a cross-sectional view along the line B-B in FIG. 5.
Figure 7:
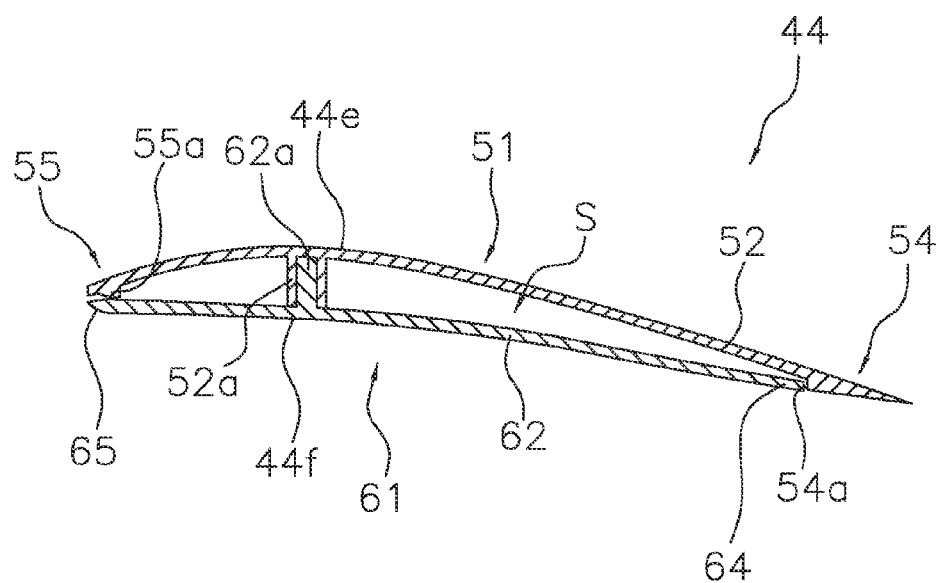
FIG. 7 is a cross-sectional view along the line C-C in FIG. 5.
Figure 8:
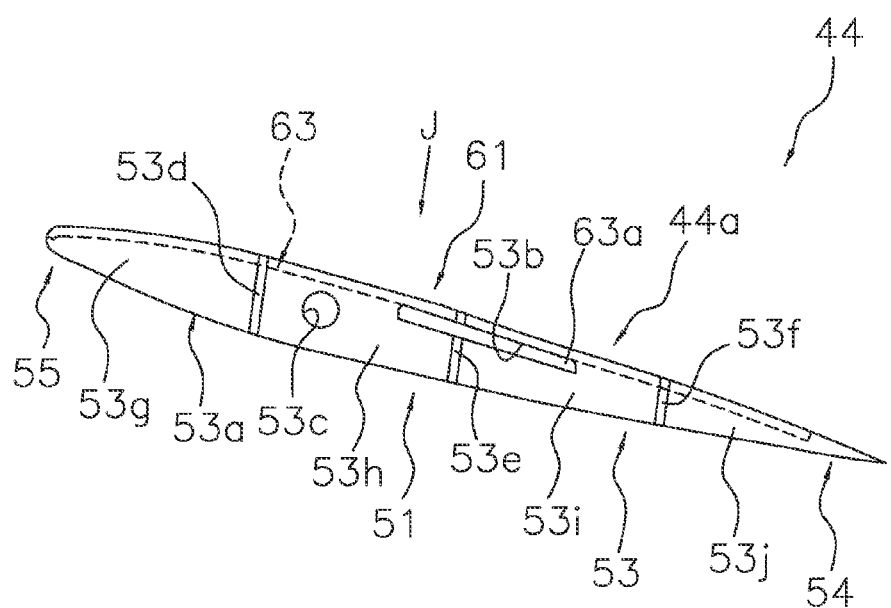
FIG. 8 is a view as indicated by the arrow D in FIG. 5.
Figure 9:
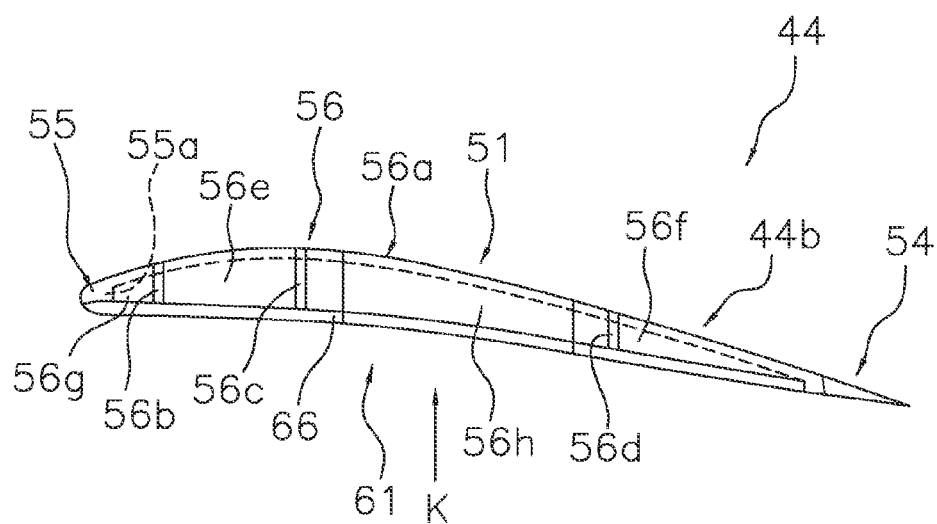
FIG. 9 is a view as indicated by the arrow E in FIG. 5.
Figure 10:
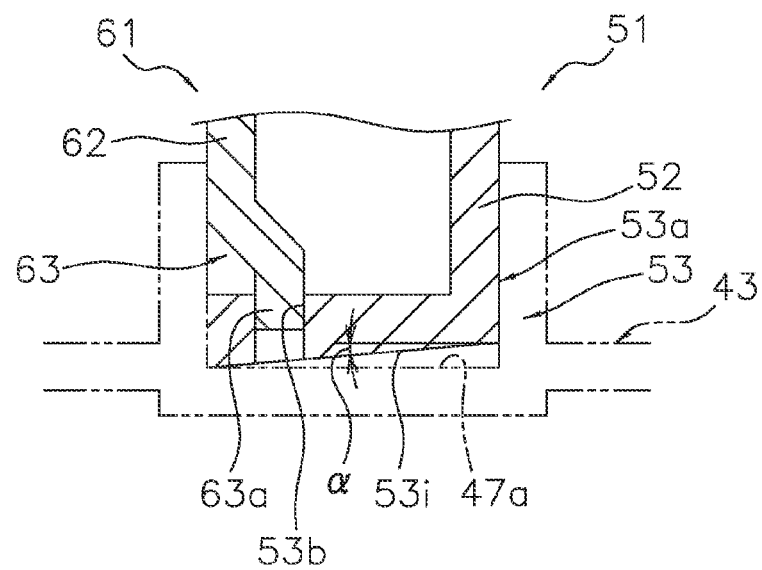
FIG. 10 is an enlarged view of the area F in FIG. 6.
Figure 11:
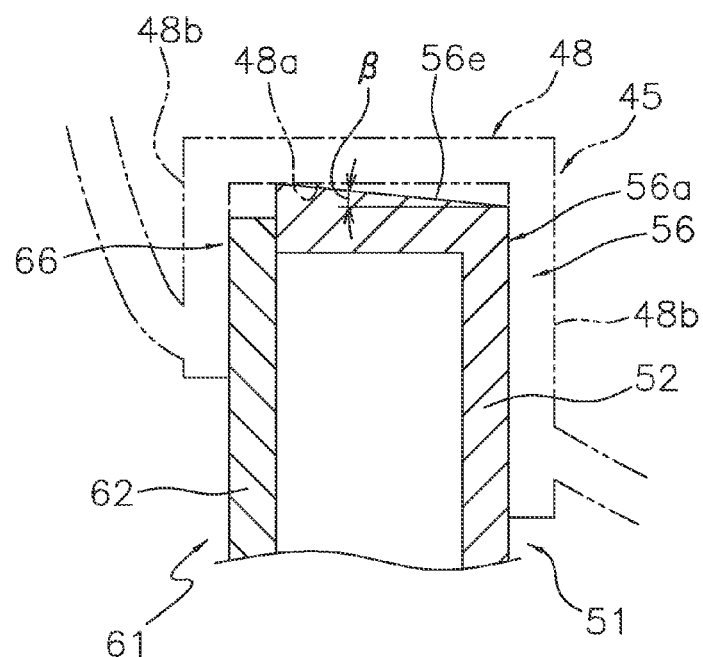
FIG. 11 is a cross-sectional view along the line G-G in FIG. 5.
Figure 12:
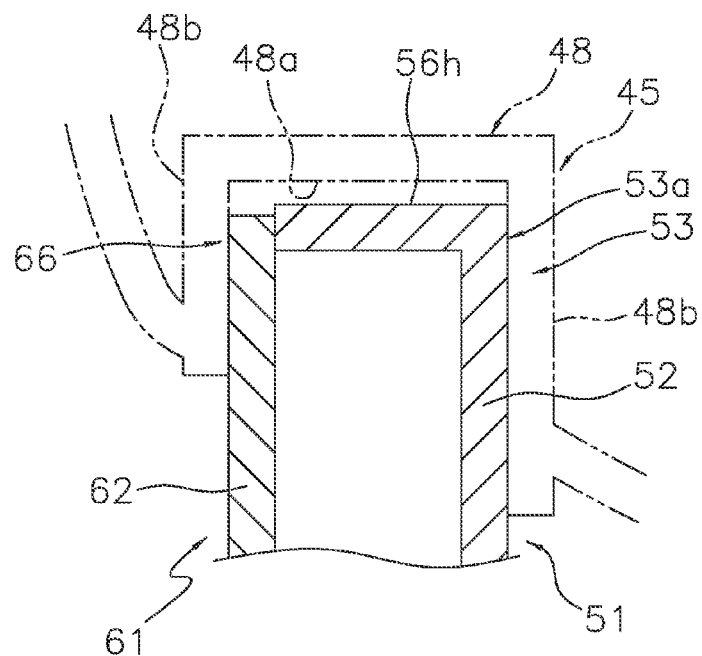
FIG. 12 is an enlarged view of the area H in FIG. 6.
Figure 13:
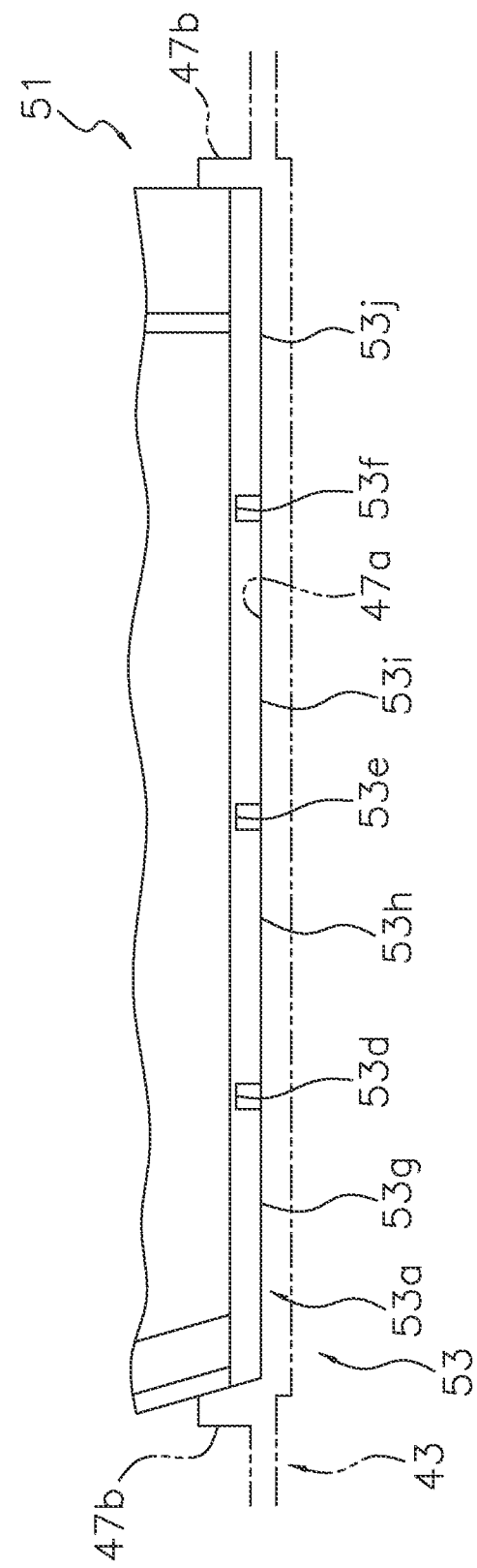
FIG. 13 is a view as indicated by the arrow J in FIG. 8 (showing only the vicinity of the end of a blade body on the side near an end plate).
Figure 14:
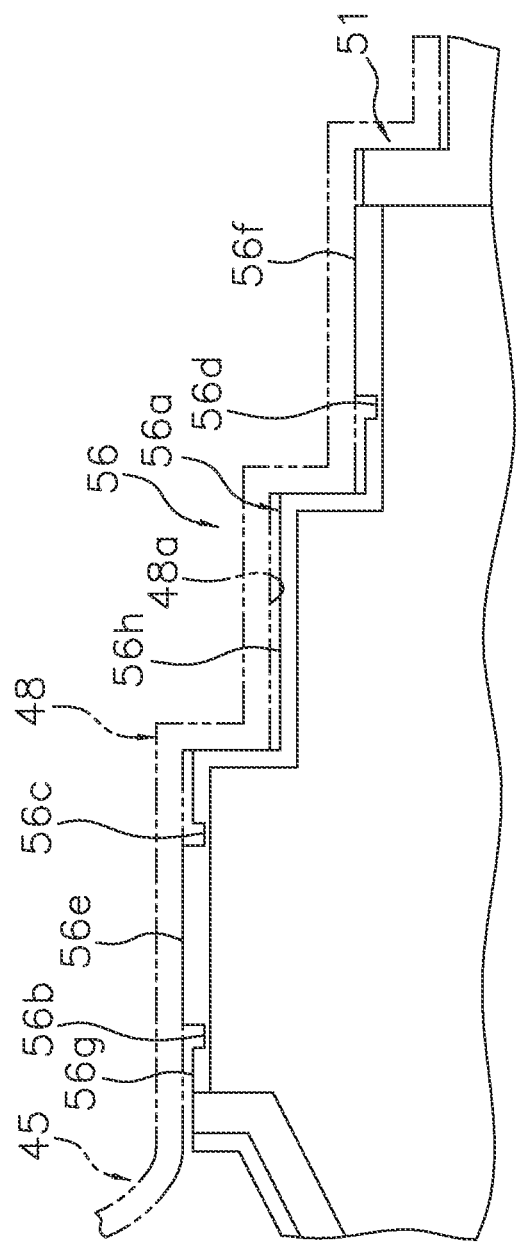
FIG. 14 is a view as indicated by the arrow K in FIG. 9 (showing only the vicinity of the end of the blade body on the side near the end ring).

Next, the blades 44 will be described using FIGS. 3 through 14. FIG. 5 is a schematic side view of the blade 44. FIG. 6 is a cross-sectional view along the line B-B in FIG. 5. FIG. 7 is a cross-sectional view along the line C-C in FIG. 5. FIG. 8 is a view as indicated by the arrow D in FIG. 5. FIG. 9 is a view as indicated by the arrow E in FIG. 5. FIG. 10 is an enlarged view of the area F in FIG. 6. FIG. 11 is a cross-sectional view along the line G-G in FIG. 5. FIG. 12 is an enlarged view of the area H in FIG. 6. FIG. 13 is a view as indicated by the arrow J in FIG. 8 (showing only the vicinity of the end of a blade body 51 on the side near the end plate 43). FIG. 14 is a view as indicated by the arrow K in FIG. 9 (showing only the vicinity of the end of the blade body 51 on the side near the end ring 45).

In the present embodiment, the blades 44 are resinous members molded separately from the end plate 43 and the end ring 45. One end of each of the blades 44 is fixed to the end ring 45, and the other end is fixed to the end ring 45. In a plan view of the impeller 42 in the present embodiment, each of the blades 44 has a wing shape inclined farther backward at the end part 44a near the end plate 43 than at the end part 44b near the end ring 45. Each of the blades 44 is also formed so that these end parts 44a, 44b intersect each other in a plan view of the impeller 42. Specifically, each of the blades 44 has a shape that extends axially while twisting between the end plate 43 and the end ring 45. Each of the blades 44 also has a shape in which, in a plan view of the impeller 42, the axially center portion of the blade 44 protrudes farther radially outward than both the end part 44a near the end plate 43 and the end part 44b near the end ring 45, and the blade 44 has a rounded wing shape when viewed along the chord of the wing. The reason for shaping the blades 44 to twist in the axial direction and for giving the blades a complex rounded shape is to improve the blowing performance and noise quality of the blower 4.

In the present embodiment, in the end facing the R direction in each of these blades 44 (hereinafter referred to as front edge part) are formed front edge corner parts 44c protruding in a staircase pattern (two steps in the present embodiment) toward the inner periphery of the impeller 42. The front edge corner parts 44c have the function of preventing air flow from separating from the negative-pressure surfaces 44f of the blades 44 when the air flow is drawn into the impeller 42 through the intake port 31 and the bell mouth 5 is blown out toward the outward periphery by the blades 44, thus contributing to reducing the noise of the blower 4. The term "negative-pressure surfaces 44f" refers to the surfaces of the blades 44 that face the inner periphery of the impeller 42, and the surfaces on the opposite sides of the negative-pressure surfaces 44f, i.e., the surfaces of the blades 44 facing the outer periphery of the impeller 42, are referred to as positive-pressure surfaces 44e.

In the present embodiment, a plurality of wave-shaped rear edge projections 44d is formed in the ends of the blades 44 on the sides opposite the R direction (these ends are hereinafter referred to as rear edges), the projections facing toward the external periphery of the impeller 42. A plurality of rear edge projections 44d have the function of reducing the pressure differences in the boundaries between the positive-pressure surfaces 44e and negative-pressure surfaces 44f in the rear edges of the blades 44 when air flow drawn into the impeller 42 through the intake port 31 and bell mouth 5 is blown out toward the outward periphery by the blades 44, thus contributing to reducing the noise of the blower 4. The shapes and numbers of the front edge corner parts 44c and the rear edge projections 44d are not limited to the shapes and numbers in the present embodiment. In cases in which the desired noise quality can be achieved without providing front edge corner parts 44c or rear edge projections 44d such as those described above, the front edges and rear edges of the blades 44 do not need to be provided with the front edge corner parts 44c or rear edge projections 44d.

Next, the detailed structure of the blades 44 will be described. In the present embodiment, the blades 44 are hollow blades, each including the blade body 51 (first blade surface part) fixed to the end plate 43 and the end ring 45, and a blade cover 61 (second blade surface part) forming a hollow space S with the blade body 51, the blade cover being mounted by fitting into the blade body 51.

In the present embodiment, each of the blade bodies 51 is a primarily plate-shaped member constituting the positive-pressure surface 44e and part of the negative-pressure surface 44f (specifically, the rear edge of the negative-pressure surface 44f) of the blade 44. In the present embodiment, each of the blade covers 61 is primarily plate-shaped member constituting part of the negative-pressure surface 44f (specifically, the portion of the negative-pressure surface 44f excluding the rear edge).

Each of the blade bodies 51 is configured from a positive-pressure surface part 52 constituting the positive-pressure surface 44e of the blade 44, a first blade weld part 53 as a rotator weld part formed on the side of the positive-pressure surface part 52 near the end plate 43, a rear edge-side edge part 54 formed on the rear edge side of the positive-pressure surface part 52, a front edge-side edge part 55 formed on the front edge side of the positive-pressure surface part 52, and a second blade weld part 56 as a rotator weld part formed on the side of the positive-pressure surface part 52 near the end ring 45.

Each of the positive-pressure surface parts 52 has in the substantial center thereof a plurality (three in the present embodiment) of annular projections 52a protruding toward the blade cover 61.

Each of the first blade weld parts 53 is a portion welded to the end plate 43 by laser welding, the first blade weld part having primarily a first blade-welding body 53a extending from the end of the positive-pressure surface part 52 near the end plate toward the blade cover 61, and an engaging hole 53b, a positioning hole 53c, and first grooves 53d, 53e, 53f formed in the first blade-welding body 53a.

The engaging hole 53b is a long hole disposed along the negative-pressure surface 44f in the substantial center of the direction (specifically, the chord direction) running from the front edge to the rear edge (or from the rear edge to the front edge) of the first blade-welding body 53a.

The positioning hole 53c is a circular hole disposed toward the front edge of the engaging hole 53b.

The first grooves 53d, 53e, 53f are long, thin grooves formed so as to extend from the end of the positive-pressure surface part 52 near the end plate 43 toward the blade cover 61, and a plurality of these grooves (three in the present embodiment, in the order of the first groove 53d, the first groove 53e, and the first groove 53f progressing from the front edge toward the rear edge) is disposed at intervals in a chordal direction. The first grooves 53d, 53e, 53f are disposed at substantially equal intervals from the front edge toward the rear edge in the present embodiment. Thus, the first blade weld part 53 has a shape partitioned by these first grooves 53d, 53e, 53f into a plurality (four in the present embodiment) of portions aligned in the chordal direction. In the present embodiment, the first grooves 53d, 53e, 53f are formed on the surface of the first blade-welding body 53a near the end plate 43.

First blade weld surfaces 53g, 53h, 53i, 53j as rotator weld surfaces are formed on the first blade weld part 53 on the surface near the end plate 43. The first blade weld surfaces 53g, 53h, 53i, 53j correspond to the plurality (four in the present embodiment) of portions of the first blade weld part 53 partitioned by the first grooves 53d, 53e, 53f. Specifically, the first blade weld surface 53g is the surface of the front edge portion of the first groove 53d on the side near the end plate 43, the first blade weld surface 53h is the surface of the portion between the first groove 53d and the first groove 53e in the chordal direction on the side near the end plate 43, the first blade weld surface 53i is the surface of the portion between the first groove 53e and the first groove 53f in the chordal direction on the side near the end plate 43, and the first blade weld surface 53j is the surface of the rear edge portion of the first groove 53f on the side near the end plate 43. The first blade weld surfaces 53g, 53h, 53i, 53j are inclined with respect to a plane orthogonal to the rotational axis line O-O of the impeller 42, in a state in which the first blade weld part 53 is disposed to face a plate weld surface 47a (described later) of the end plate 43 (only the first blade weld surface 53i is shown in FIG. 10) in the axial direction. In the present embodiment, each of the first blade weld surfaces 53g, 53h, 53i, 53j is inclined so that areas of this surface farther away from the end of the positive-pressure surface part 52 toward the end plate 43 and closer to a plate-side edge part 63 (described later) protrudes closer to the end plate 43 in the axial direction. The angle of inclination α of the first blade weld surfaces 53g, 53h, 53i, 53j with respect to a plane orthogonal to the rotational axis line O-O of the impeller 42 is from 0.5 degrees to 2.5 degrees, in a state in which the first blade weld part 53 is disposed to face the plate weld surface 47a (described later) of the end plate 43 in the axial direction.

The rear edge-side edge part 54 constitutes the rear edge part of the positive-pressure surface 44e and the rear edge part of the negative-pressure surface 44f of each of the blades 44, and has the plurality of rear edge projections 44d described above, and a rear edge-side contact part 54a formed in the front edges of the rear edge projections 44d and pressed against a rear edge-side edge part 64 (described later) of the blade cover 61.

The front edge-side edge part 55 constitutes the portion of the front edge corner parts 44c near the positive-pressure surface part 52, and has a first front edge-side contact part 55a formed in the rear edges of the front edge corner parts 44c and pressed against a front edge-side edge part 65 (described later) of the blade cover 61.

Each of the second blade weld parts 56 is a portion welded to the end ring 45 by laser welding, and primarily has a second blade weld body 56a extending from the end of the positive-pressure surface part 52 near the end ring 45 toward the blade cover 61, and second grooves 56b, 56c, 56d. The second blade weld body 56a is directed from the front edge toward the rear edge of each of the blades 44, and is shaped so as to form an end face in which the distance from the end face near the end plate 43 decreases in a staircase pattern (three steps in the present embodiment). The second grooves 56b, 56c, 56d are long, thin grooves formed so as to extend from the end of the positive-pressure surface part 52 near the end ring 45 toward the blade cover 61, and a plurality of these grooves (three in the present embodiment, in the order of the second groove 56b, the second groove 56c, and the second groove 56d from the front edge toward the rear edge) is disposed at intervals in the chordal direction. The second grooves 56b, 56c are disposed in the foremost portion of the second blade weld body 56a, and the second groove 56d is disposed in the rearmost portion of the second blade weld body 56a. Thus, the second blade weld part 56 has a shape partitioned by these second grooves 56b, 56c, 56d into a plurality (four in the present embodiment) of portions aligned in the chordal direction. In the present embodiment, the second grooves 56b, 56c, 56d are formed on the surface of the second blade weld body 56a near the end ring 45.

Second blade weld surfaces 56e, 56f and second blade flat surfaces 56g, 56h are formed in the surface of the second blade weld part 56 near the end ring 45. The second blade weld surfaces 56e, 56f correspond to the plurality (four in the present embodiment) of portions of the second blade weld part 56 partitioned by the second grooves 56b, 56c, 56d. Specifically, the second blade weld surface 56e is the surface near the end ring 45 between the second groove 56b and the second groove 56c in the chordal direction, and the second blade weld surface 56f is the surface of the rear edge-side portion of the second groove 56d near the end ring 45. The second blade flat surface 56g is the surface of the front edge-side portion of the second groove 56b near the end ring 45, and the second blade flat surface 56h is the surface near the end ring 45 of the portion between the second groove 56c and the second groove 56d in the chordal direction. The second blade weld surfaces 56e, 56f are inclined with respect to a plane orthogonal to the rotational axis line O-O of the impeller 42, in a state in which the second blade weld part 56 is disposed to face a ring weld surface 48a (described later) of the end ring 45 (only the second blade weld surface 56e is shown in FIG. 11) in the axial direction. In the present embodiment, the second blade weld surfaces 56e, 56f are inclined so as to protrude to the side of the end ring 45 in the axial direction as the second blade weld surfaces are oriented to a ring-side edge part 66 (described later) from the end of the positive-pressure surface part 52 near the end ring 45. The angle of inclination β of the second blade weld surfaces 56e, 56f with respect to a plane orthogonal to the rotational axis line O-O of the impeller 42 is from 0.5 degrees to 2.5 degrees, in a state in which the second blade weld part 56 is disposed to face the ring weld surface 48a (described later) of the end ring 45 in the axial direction. The second blade flat surfaces 56g, 56h are parallel to a plane orthogonal to the rotational axis line O-O of the impeller 42, in a state in which the second blade weld part 56 is disposed to face the ring weld surface 48a (described later) of the end ring 45 (only the second blade flat surface 56h is shown in FIG. 12) in the axial direction. Unlike the second blade weld surfaces 56e, 56f, the second blade flat surfaces 56g, 56h do not have portions that protrude in the axial direction toward the end ring 45.

Each of the blade covers 61 includes a negative-pressure surface part 62 constituting part of the negative-pressure surface 44f of the blade 44 (in the present embodiment, the portion of the negative-pressure surface 44f excluding the rear edge part), a plate-side edge part 63 formed on the side of the negative-pressure surface part 62 near the end plate 43, a rear edge-side edge part 64 formed on the rear edge side of the negative-pressure surface part 62, a front edge-side edge part 65 formed on the front edge side of the negative-pressure surface part 62, and a ring-side edge part 66 formed on the side of the negative-pressure surface part 62 near the end ring 45.

Each of the negative-pressure surface parts 62 has, at a position corresponding to the annular projections 52a formed in the positive-pressure surface part 52 of the blade body 51, a plurality (three in the present embodiment) of fitting projections 62a which protrude toward the blade body 51. These fitting projections 62a fit with each of the central concave parts of the corresponding annular projections 52a, and are inserted either until the surface of the negative-pressure surface part 62 near the blade body 51 comes into contact with the ends of the annular projections 52a near the blade cover 61, or until the surface of the positive-pressure surface part 52 near the blade cover 61 comes into contact with the ends of the fitting projections 62a near the blade body 51.

The plate-side edge part 63 has a shape that follows the end face of the first blade-welding body 53a and is in contact with the end face of the first blade-welding body 53a near the end ring 45. An engaging pawl 63a that extends from the side near the end ring 45 toward the end plate 43 is formed in the end of the plate-side edge part 63 near the end plate 43, and this pawl is designed to be inserted into the engaging hole 53b. The engaging pawl 63a is formed so that when the pawl is inserted into the engaging hole 53b, the pawl does not protrude from the end face of the first blade-welding body 53a near the end plate 43 (specifically, the first blade weld surfaces 53h, 53i) in the axial direction toward the end plate 43, including cases in which a pressure load is applied to the blade 44 during the laser welding steps described hereinafter. The end part 44a fixed to the end plate 43 is configured by the first blade weld part 53 of the blade body 51 and the plate-side edge part 63 of the blade cover 61.

The rear edge-side edge part 64 has a shape that follows along the rear edge-side edge part 54 and is in contact with the end face of the rear edge-side contact part 54a near the blade cover 61.

The front edge-side edge part 65 constitutes the portion of the front edge corner parts 44c near the negative-pressure surface part 62 and is in contact with the end face of the first front edge-side contact part 55a on the side near the blade cover 61.

The ring-side edge part 66 has a shape that follows along the stepped end face of the second blade weld body 56a and is in contact with the end face of the second blade weld body 56a on the side near the blade cover 61. The end face of the ring-side edge part 66 near the end ring 45 is formed so as not to protrude from the end face of the second blade weld body 56a near the end ring 45 in the axial direction toward the end ring 45, including cases in which a pressure load is applied to the blade 44 during the laser welding steps described hereinafter. The end part 44b fixed to the end ring 45 is configured by the second blade weld part 56 of the blade body 51 and the ring-side edge part 66 of the blade cover 61.

The blade 44 is assembled by inserting the engaging pawl 63a of the blade cover 61 into the engaging hole 53b of the blade body 51, and then fitting the fitting projections 62a of the blade cover 61 into the central concave parts of the annular projections 52a of the blade body 51. A hollow space S is thereby formed between the blade body 51 and the blade cover 61. Since the blade body 51 and the blade cover 61 are molded separately, there are few restrictions on the draft direction of the mold used during molding, and the space S can be easily increased even in cases of a rounded, complex wing shape which twists axially, as is the case in the present embodiment. This facilitates making the blade 44 hollow and makes it possible to reduce the weight of the impeller 42.

Figure 15:
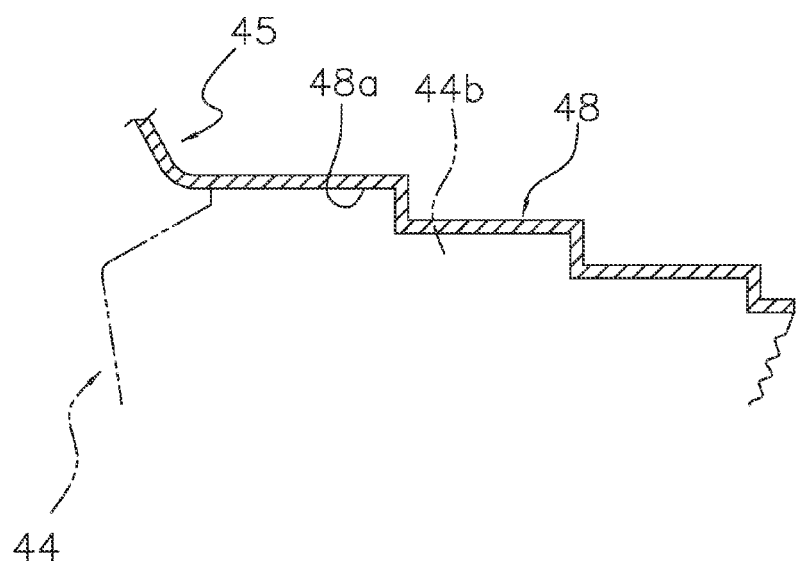
FIG. 15 is a cross-sectional view along the line L-L in FIG. 4 (showing only the end ring).
Figure 16:
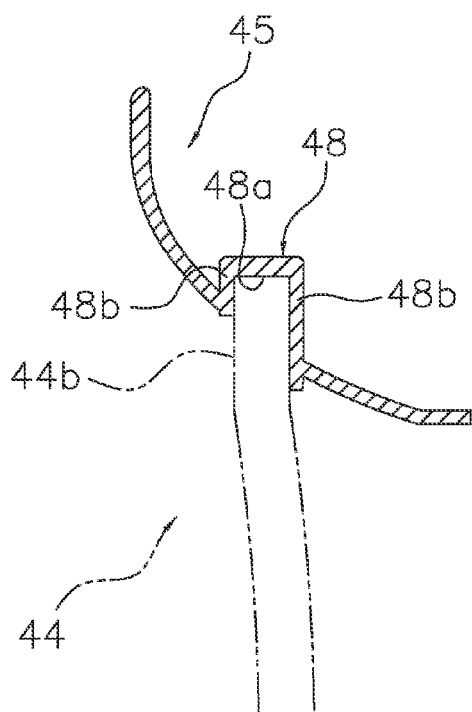
FIG. 16 is a cross-sectional view along the line M-M in FIG. 4 (showing only the end ring).
Figure 17:
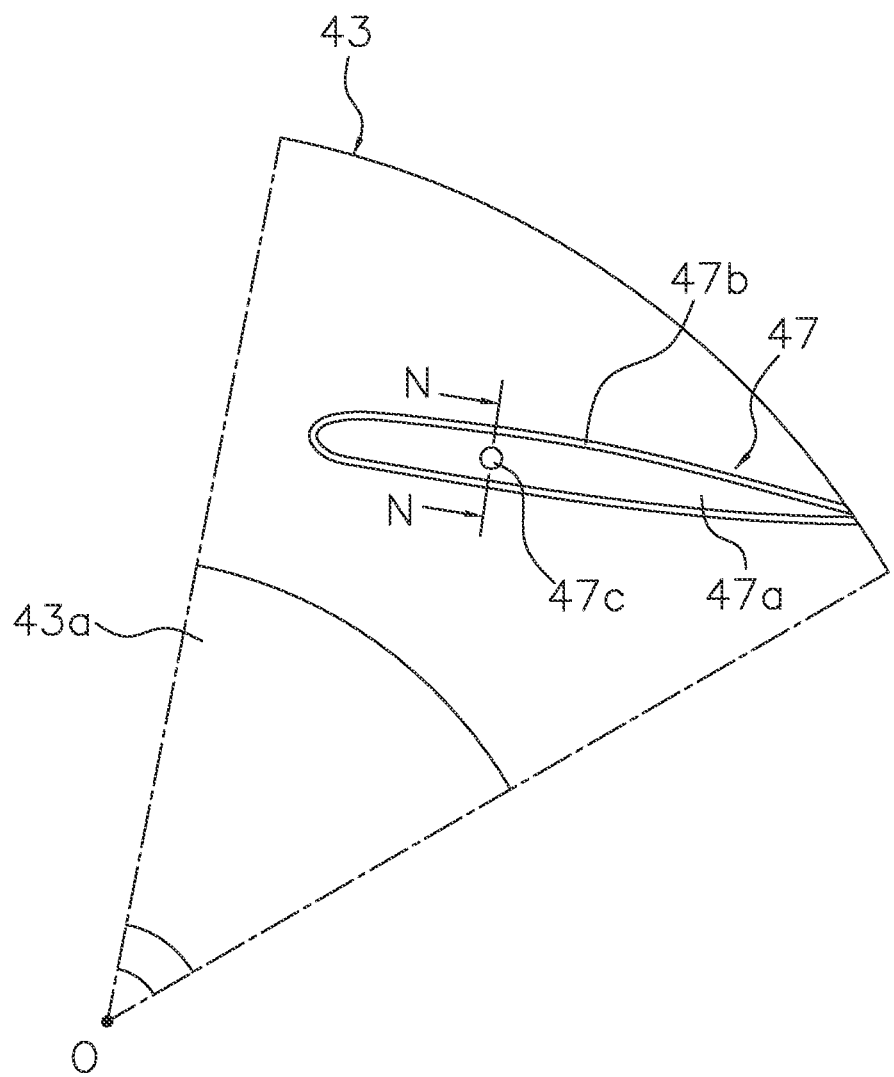
FIG. 17 is a partial plan view of the end plate.
Figure 18:
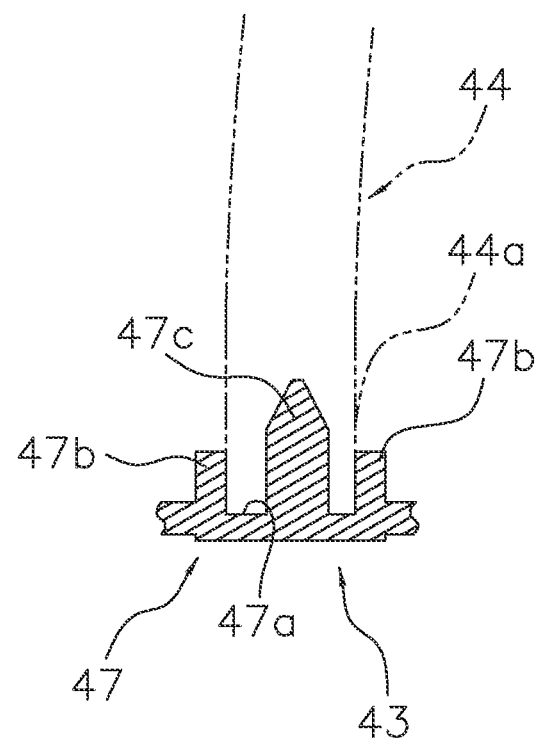
FIG. 18 is a cross-sectional view along the line N-N in FIG. 17.

Next, the detailed structure of the end plate 43 and the end ring 45, particularly the positioning structure of the blades 44, will be described using FIGS. 8 through 18. FIG. 15 is a cross-sectional view along the line L-L in FIG. 4 (showing only the vicinity of the end ring 45). FIG. 16 is a cross-sectional view along the line M-M in FIG. 4 (showing only the vicinity of the end ring 45). FIG. 17 is a partial plan view of the end plate 43. FIG. 18 is a cross-sectional view along the line N-N in FIG. 17.

First, the end ring 45 will be described. When the blades 44 are fixed to the end ring 45, a plurality of blades 44 must be disposed at specific fixed positions. In the impeller 42 of the present embodiment, formed in the end ring 45 are ring weld parts 48 as rotator weld parts that can be fitted with the end parts 44b of the blades 44 on the sides near the end ring 45 (specifically, the second blade weld parts 56 of the blade bodies 51 and the ring-side edge parts 66 of the blade covers 61), making it possible to position the blades 44.

Formed in each ring weld part 48 are a ring weld surface 48a (rotating body weld surface) that is disposed to face the stepped end faces of the end parts 44b formed on the surfaces near the end plate 43 in the axial direction, and a blade fitting part 48b extending from the peripheral edge of the ring weld surface 48a along the end parts 44b in the axial direction toward the end plate 43. In the present embodiment, the ring weld surfaces 48a are parallel to a plane orthogonal to the rotational axis line O-O of the impeller 42, in a state in which the second blade weld parts 56 are disposed to face the ring weld surfaces 48a of the end ring 45 in the axial direction. In a state in which the end parts 44b of the blades 44 are fitted with the blade fitting parts 48b, and the second blade weld parts 56 are disposed to face the ring weld surfaces 48a of the end ring 45 in the axial direction, the second blade weld surfaces 56e, 56f are inclined with respect to a plane orthogonal to the rotational axis line O-O of the impeller 42, whereby gaps are formed in the axial direction with the ring weld surfaces 48a, excluding the portions of the second blade weld surfaces 56e, 56f of the blades 44 in proximity to the ring weld surfaces 48a. Gaps are also formed in the axial direction between the second blade flat surfaces 56g, 56h and the ring weld surfaces 48a.

The end parts 44b of the blades 44 are fitted with the ring weld parts 48 (specifically, with the blade fitting parts 48b), whereby the end parts 44b (specifically, the second blade weld parts 56 of the blade bodies 51) are disposed to face the ring weld surfaces 48a in the axial direction, and the second blade weld parts 56 are then laser welded to the ring weld surfaces 48a, whereby the blades 44 are fixed to the end ring 45. The reason that laser welding is used as the method for fixing the blades 44 to the end ring 45 is because it is preferable to use a procedure in which the heat-affected areas during welding are small in width and there is little strain, considering that the blades 44 of the present embodiment are hollow, thin blades, that the blades are shaped to twist in the axial direction, and that the blades have a rounded, complex wing shape. In the welding steps described later, in order to perform laser welding easily from the sides near the end ring 45, the material constituting the end ring 45 is preferably more optically transmissive than the material constituting the blade bodies 51. For example, the end ring 45 can be white or milky white in color, and the blade bodies 51 can be black in color.

Next, the end plate 43 will be described. When the blades 44 are fixed to the end plate 43, a plurality of blades 44 must be disposed at specific fixing positions similar to cases in which the blades 44 are fixed to the end ring 45. In the impeller 42 of the present embodiment, formed in the end plate 43 are plate weld parts 47 as rotator weld parts that can be fitted with the end parts 44a on the sides of the blades 44 near the end plate 43 (specifically, with the first blade weld parts 53 of the blade bodies 51 and the plate-side edge parts 63 of the blade covers 61), making it possible to position the blades 44.

Formed in the plate weld part 47 are plate weld surfaces 47a (rotator weld surfaces) disposed to face the end faces of the end parts 44a formed on the surfaces near the end ring 45 in the axial direction, blade fitting parts 47b extending from the peripheral edges of the plate weld surfaces 47a along the end parts 44a in the axial direction toward the end ring 45, and positioning projections 47c that can be inserted into the positioning holes 53c formed in the end parts 44a (specifically, the first blade-welding bodies 53a). In the present embodiment, the plate weld surfaces 47a are parallel to a plane orthogonal to the rotational axis line O-O of the impeller 42, in a state in which the first blade weld parts 53 are disposed to face the plate weld surfaces 47a of the end plate 43 in the axial direction. In a state in which the end parts 44a of the blades 44 are fitted with the blade fitting parts 47b, and the first blade weld parts 53 are disposed to face the plate weld surfaces 47a of the end plate 43 in the axial direction, the first blade weld surfaces 53g, 53h, 53i, 53j are inclined with respect to a plane orthogonal to the rotational axis line O-O of the impeller 42, whereby gaps are formed in the axial direction with the plate weld surfaces 47a, excluding the portions of the first blade weld surfaces 53g, 53h, 53i, 53j of the blades 44 in proximity to the plate weld surfaces 47a.

The end parts 44a of the blades 44 are fitted with the plate weld parts 47 (specifically, with the blade fitting parts 47b), whereby the end parts 44a (specifically, the first blade weld parts 53 of the blade bodies 51) are disposed to face the plate weld surfaces 47a in the axial direction, and the first blade weld parts 53 are then laser welded to the plate weld surfaces 47a, whereby the blades 44 are fixed to the end plate 43. The reason that laser welding is used as the method for fixing the blades 44 to the end plate 43 is because it is preferable to use a procedure in which the heat-affected areas during welding are small in width and there is little strain, considering that the blades 44 of the present embodiment are hollow, thin blades, that the blades are shaped to twist in the axial direction, and that the blades have a rounded, complex wing shape. In the welding steps described later, in order to perform laser welding easily from the sides near the end plate 43, the material constituting the end plate 43 is preferably more optically transmissive than the material constituting the blade bodies 51. For example, the end plate 43 can be white or milky white in color, and the blade bodies 51 can be black in color.

(3) Method for Manufacturing Impeller

Figures 19A, 19B, 19C:
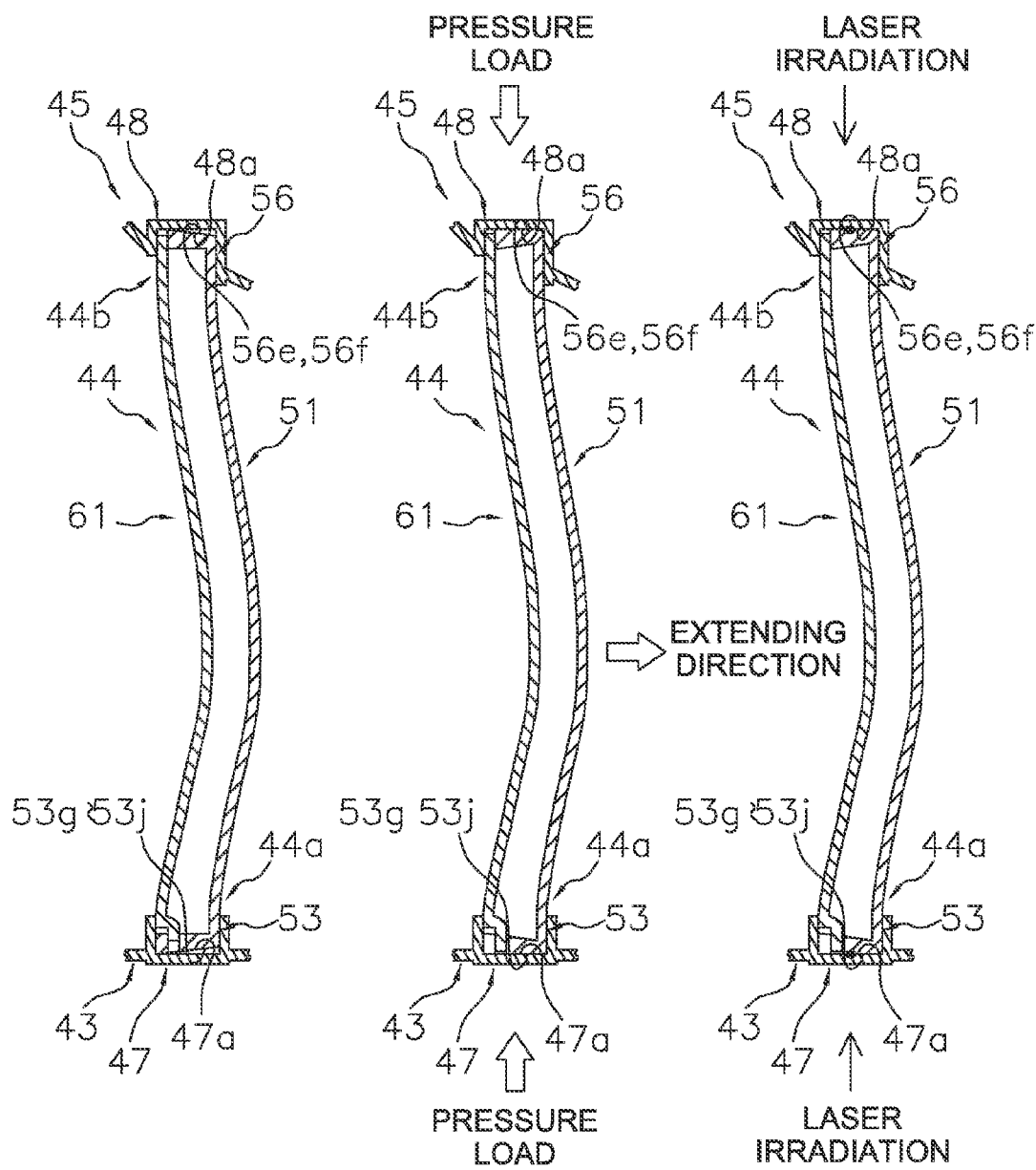
FIGS. 19(a), 19(b), and 19(c) include drawings showing the steps of fixing the blade to the end plate and the end ring by laser welding, wherein (a) shows the state in which the blade is disposed at a specific position between the end ring and the end plate in the axial direction, (b) shows the state in which a load is applied to the end ring and the end plate, and (c) shows the state in which the blade is laser welded to the end ring and the end plate.

Next, the method for manufacturing the impeller 42 will be described using FIGS. 5 through 21. FIGS. 19(a), 19(b) and 19(c) include drawings showing the steps of fixing a blade 44 to the end plate 43 and the end ring 45 by laser welding, wherein FIG. 19(a) shows the state in which the blade 44 is disposed at a specific position between the end ring 45 and the end plate 43 in the axial direction, FIG. 19(b) shows the state in which a load is applied to the end ring 45 and the end plate 43, and FIG. 19(c) shows the state in which the blade 44 is laser welded to the end ring 45 and the end plate 43. FIGS. 20(a) and 20(b) show the state in which a first blade weld part 53 moves in the axial direction when a pressure load is applied to the end plate 43 in a case in which the gap between a part of first blade weld surface 53h and the plate weld surface 47a is larger than the gaps between the other first blade weld surfaces 53g, 53i, 53j and the plate weld surface 47a; wherein FIG. 20(a) shows the state in which the blade 44 is disposed at a specific position in the end plate 43, and FIG. 20(b) shows the state in which a load is applied to the end plate 43. FIGS. 21(a) and 21(b) show the state in which a second blade weld part 56 moves in the axial direction when a pressure load is applied to the end ring 45, wherein FIG. 21(*a*) shows the state in which a blade 44 is disposed at a specific position in the end ring 45, and FIG. 21(*b*) shows the state in which the load is applied to the end ring 45.

First, the blade bodies 51, the blade covers 61, the end plate 43, and the end ring 45 are molded from a resin and prepared for use.

Next, the blade covers 61 are attached by being fitted into the blade bodies 51 to assemble the blades 44. Specifically, the engaging pawls 63*a* of the blade covers 61 are inserted into the engaging holes 53*b*, and the fitting projections 62*a* of the blade covers 61 are then fitted into the annular projections 52*a* of the blade bodies 51 to assemble the blades 44.

Next, the end parts 44*b* of the blades 44 near the end ring 45 are fitted with the ring weld parts 48 of the end ring 45, and the end parts 44*a* of the blades 44 are fitted with the plate weld parts 47 of the end plate 43, whereby a plurality of blades 44 are disposed at specific positions between the end ring 45 and the end plate 43 in the axial direction. This results in a state in which the first blade weld parts 53 are disposed to face the plate weld surfaces 47*a* in the axial direction, and the second blade weld parts 56 are disposed to face the ring weld surfaces 48*a* in the axial direction. At this time, since the first blade weld surfaces 53*g*, 53*h*, 53*i*, 53*j* are inclined with respect to the plate weld surfaces 47*a*, and the second blade weld surfaces 56*e*, 56*f* are inclined with respect to the ring weld surfaces 48*a*, gaps are formed in the axial direction with the plate weld surfaces 47*a* (see FIGS. 10 through 14 and FIG. 19(*a*)), excluding the portions of the first blade weld surfaces 53*g*, 53*h*, 53*i*, 53*j* of the blades 44 in proximity to the plate weld surfaces 47*a* (the portions near the blade covers 61 in this case).

Next, a pressure load is applied to the end plate 43 and the end ring 45, so as to cause the blades 44 to be compressed in the axial direction by the end plate 43 and the end ring 45. At this time, in the end parts 44*a* of the blades 44 near the end plate 43, the pressure load concentrates in the portions of the first blade weld surfaces 53*g*, 53*h*, 53*i*, 53*j* near the blade covers 61, whereby the first blade weld surfaces 53*g*, 53*h*, 53*i*, 53*j* are pressed in the axial direction toward the end ring 45 by the plate weld surfaces 47*a*, and substantially the entire first blade weld surfaces 53*g*, 53*h*, 53*i*, 53*j* are firmly adhered along the plate weld surfaces 47*a* accordingly (see FIG. 19(*b*)). In the end parts 44*b* of the blades 44 near the end ring 45, the pressure load concentrates in the portion of the second blade weld surfaces 56*e*, 56*f* near the blade covers 61, similar to the end parts 44*a*, whereby the second blade weld surfaces 56*e*, 56*f* are pressed in the axial direction toward the end plate 43 by the ring weld surfaces 48*a*, and substantially the entire second blade weld surfaces 56*e*, 56*f* are firmly adhered along the ring weld surfaces 48*a* accordingly.

Depending on the finishing precision during the resin molding of the blades 44 and the end plate 43, there are cases in which unevenness occur in the first blade weld surfaces 53*g*, 53*h*, 53*i*, 53*j* and the plate weld surfaces 47*a*, and the gaps between each of the first blade weld surfaces 53*g*, 53*h*, 53*i*, 53*j* and the plate weld surfaces 47*a* may sometimes occur unevenness in the weld surfaces 53*g*, 53*h*, 53*i*, 53*j*, 47*a*. For example, in a state in which a blade 44 is disposed at a specific position in the end plate 43 as shown in FIG. 20(*a*), a case is considered in which, among the gaps between the first blade weld surfaces 53*g*, 53*h*, 53*i*, 53*j* and the plate weld surface 47*a* in the axial direction, the gap between the first blade weld surface 53*h* and the plate weld surface 47*a* is larger than the gaps between the other first blade weld surfaces 53*g*, 53*i*, 53*j* and the plate weld surface 47*a*. In such a case, when the pressure load is applied to the end plate 43, the portions of the first blade weld surfaces 53*g*, 53*i*, 53*j* near the blade covers 61 are pressed in the axial direction toward the end ring 45 as shown in FIG. 20(*b*). At this time, since the first grooves 53*d*, 53*e*, 53*f* are formed and the first blade weld surface 53*h* is not pressed in the axial direction toward the end ring 45, the first grooves 53*d*, 53*e* formed in the first blade weld surface 53*h* in the chordal direction deform in accordance with the distance by which the first blade weld surfaces 53*g*, 53*i* move in the axial direction. When the distance by which the first blade weld surfaces 53*g*, 53*i* move in the axial direction has increased to a certain point, the first blade weld surface 53*h* comes into contact with the plate weld surface 47*a*, and substantially the entire first blade weld surfaces 53*g*, 53*h*, 53*i*, 53*j* are firmly adhered to the plate weld surface 47*a*. Thus, substantially the entire first blade weld surfaces 53*g*, 53*h*, 53*i*, 53*j* are firmly adhered to the plate weld surface 47*a* by the first grooves 53*d*, 53*e*, 53*f* even in cases in which unevenness are formed in the first blade weld surfaces 53*g*, 53*h*, 53*i*, 53*j* or the plate weld surface 47*a*, and there is less chance that there will be portions where the gaps between the weld surfaces cannot be reduced.

Concerning the axial movement of the second blade weld surfaces 56*e*, 56*f* of the second blade weld parts 56, in a state in which a blade 44 is disposed at a specific position in the end ring 45 as shown in FIG. 21(*a*), the second blade flat surfaces 56*g*, 56*h*, which are parallel to the ring weld surface 48*a*, are disposed at positions axially farther away from the ring weld surface 48*a* than the portions of the second blade weld surfaces 56*e*, 56*f* in proximity to the ring weld surface 48*a*. Therefore, when a pressure load is applied to the end ring 45 in this state, the portions of the second blade weld surfaces 56*e*, 56*f* near the blade cover 61 are pressed in the axial direction toward the end plate 43, as shown in FIG. 21(*b*). Therefore, when a pressure load is applied to the end ring 45 as shown in FIG. 21(*b*), only the portions of the second blade weld part 56 that correspond to the second blade weld surfaces 56*e*, 56*f* are moved axially by the pressure load, the second grooves 56*b*, 56*c*, 56*d* deform in accordance with the distance by which the second blade weld surfaces 56*e*, 56*f* move in the axial direction, and as a result, the portions corresponding to the second blade flat surfaces 56*g*, 56*h* do not readily move in the axial direction. The pressure load can then be reliably concentrated in the portions of the second blade weld surfaces 56*e*, 56*f* that are closer to the ring weld surface 48*a* than the second blade flat surfaces 56*g*, 56*h*, and the pressure load applied to the end ring 45 can therefore be further reduced.

Next, in a state in which a pressure load is applied to the end plate 43 and the end ring 45 so as to compress the blades 44 in the axial direction, laser light is irradiated at the first blade weld parts 53 (more specifically, at the four locations of the first blade weld surfaces 53*g*, 53*h*, 53*i*, 53*j*) from the surface of the end plate 43 on the opposite side of the blades 44 in the axial direction, and the blades 44 are fixed to the plate weld surfaces 47*a* by welding. Laser light is also irradiated at the second blade weld parts 56 (more specifically, at the two locations of the second blade weld surfaces 56*e*, 56*f*) from the surface of the end ring 45 on the opposite side of the blades in the axial direction, and the blades 44 are fixed to the ring weld surfaces 48*a* by welding. At this time, the desired welding strength can be achieved in a stable manner because the adherence between the first blade weld surfaces 53*g*, 53*h*, 53*i*, 53*j* and the plate weld surfaces 47*a* are satisfactory, and the adherence between the second blade weld surfaces 56*e*, 56*f* and the ring weld surfaces 48*a* are satisfactory.

(4) The following characteristics are found in the blades 44 constituting the blower 4 used in the air conditioning apparatus 1 of the present embodiment, in the impeller 42 comprising these blades, and in the method for manufacturing the impeller 42.

(A) The blades 44 constituting the blower 4 of the present embodiment are resinous hollow blades having hollow spaces formed in interiors thereof, and the first blade weld surfaces 53g, 53h, 53i, 53j inclined (angle of inclination α, see FIG. 10) with respect to the plate weld surfaces 47a are formed in the first blade weld parts 53 in a state in which the first blade weld parts 53 are disposed to face the plate weld surfaces 47a as rotator weld surfaces (see FIG. 19(a)) in the axial direction. The second blade weld surfaces 56c, 56f inclined (angle of inclination β, see FIG. 11) with respect to the ring weld surfaces 48a are formed in the second blade weld parts 56 in a state in which the blades 44 are disposed so that the second blade weld parts 56 face the ring weld surfaces 48a as rotator weld surfaces (see FIG. 19(a)) in the axial direction.

With such blades 44, when a load is applied so as to press the end plate 43 and the blades 44 each other in the axial direction as the blades 44 are fixed by laser welding to the end plate 43, the portions in proximity to the plate weld surfaces 47a formed by the inclining of the first blade weld surfaces 53g, 53h, 53i, 53j (the portions near the blade covers 61 in this case) are firmly pressed into the plate weld surfaces 47a in a state in which the first blade weld parts 53 are disposed to face the plate weld surfaces 47a in the axial direction. As a result, the adherence between the first blade weld surfaces 53g, 53h, 53i, 53j and the plate weld surfaces 47a is satisfactory, and the blades 44 can therefore be fixed to the end plate 43 with high welding strength. With these blades 44, when a load is applied so as to press the end ring 45 and the blades 44 each other in the axial direction as the blades 44 are fixed by laser welding to the end ring 45, the portions in proximity to the ring weld surfaces 48a formed by the inclining of the second blade weld surfaces 56e, 56f (the portions near the blade covers 61 in this case) are firmly pressed into the ring weld surfaces 48a in a state in which the second blade weld parts 56 are disposed to face the ring weld surfaces 48a in the axial direction. As a result, the adherence between the second blade weld surfaces 56e, 56f and the ring weld surfaces 48a is satisfactory, and the blades 44 can therefore be fixed to the end ring 45 with high welding strength.

With these blades 44, it is thereby possible to achieve satisfactory adherence between the first blade weld surfaces 53g, 53h, 53i, 53j of the blades 44 and the plate weld surfaces 47a of the end plate 43, or satisfactory adherence between the second blade weld surfaces 56e, 56f of the blades 44 and the ring weld surfaces 48a of the end ring 45; and to achieve welding strength in a stable manner, even in cases in which unevenness are formed in each of the weld surfaces due to the finishing precision during resin molding of the blades 44, the end plate 43, and the end ring 45. In cases in which the blades 44 are given a complex rounded shape in order to improve blowing performance or noise quality (see FIGS. 4 and 19(a)-(c)), or in cases in which the blades 44 are thinned in order to reduce the weight of the impeller 42, when the pressure load such as is described above is applied, the load compressing the blades 44 in the axial direction is applied, causing the blades 44 to bend, and there is a danger that the gaps will increase between the first blade weld surfaces 53g, 53h, 53i, 53j of the blades 44 and the plate weld surfaces 47a of the end plate 43, or that the gaps will increase between the second blade weld surfaces 56e, 56f of the blades 44 and the ring weld surfaces 48a of the end ring 45. However, with the blades 44, the pressure load can be concentrated in the portions in proximity to the plate weld surfaces 47a formed by the inclining of the first blade weld surfaces 53g, 53h, 53i, 53j (the portions near the blade covers 61 in this case), or in the portions in proximity to the ring weld surfaces 48a formed by the inclining of the second blade weld surfaces 56e, 56f (the portions near the blade covers 61 in this case). Therefore, the pressure load applied between the blades 44 and the end plate 43 or end ring 45 can be reduced in comparison with cases in which an attempt is made to firmly adhere the entire un-inclined blade weld surfaces to the entire plate weld surfaces of the end plate. There is thereby less danger that the gaps will increase between the first blade weld surfaces 53g, 53h, 53i, 53j of the blades 44 and the plate weld surfaces 47a of the end plate 43. It is also possible to achieve satisfactory adherence between the first blade weld surfaces 53g, 53h, 53i, 53j of the blades 44 and the plate weld surfaces 47a of the end plate 43, or between the second blade weld surfaces 56e, 56f of the blades 44 and the ring weld surfaces 48a of the end ring 45, and the desired welding strength can be achieved in a stable manner.

Thus, the impeller 42 of the present embodiment is manufactured by forming the first blade weld surfaces 53g, 53h, 53i, 53j inclined with respect to the plate weld surfaces 47a in a state in which the first blade weld parts 53 are disposed to face the plate weld surfaces 47a of the end plate 43 in the axial direction, and also in a state in which the second blade weld parts 56 are disposed to face the ring weld surfaces 48a of the end ring 45 in the axial direction; and by fixing the blades 44, on which are formed the second blade weld surfaces 56e, 56f inclined with respect to the ring weld surfaces 48a, by laser welding to the end plate 43 and the end ring 45, in a state in which the load is applied so as to press the end plate 43 and the blades 44 each other in the axial direction, and also in a state in which the load is applied so as to press the end ring 45 and the blades 44 each other in the axial direction. The blades are therefore fixed to the blade-supporting rotator with high welding strength. Therefore, when the blades 44 are fixed by laser welding to the end plate 43 or the end ring 45, the pressure load applied between the blades 44 and the end plate 43 or end ring 45 in the axial direction can be reduced, the length of the laser welded portions can be reduced, the blades 44 can be given a complex rounded shape in order to improve blowing performance and noise quality, the blades 44 can be thinned in order to reduce the weight of the impeller 42, and, as a result, costs can be reduced.

(B) With the blades 44 constituting the blower 4 of the present embodiment, since the angle of inclination α of the first blade weld surfaces 53g, 53h, 53i, 53j with respect to the plate weld surfaces 47a is 0.5 degrees or more, and the angle of inclination β of the second blade weld surfaces 56e, 56f with respect to the ring weld surfaces 48a is 0.5 degrees or greater, the gaps that may form between the first blade weld surfaces of the blades and the plate weld surfaces of the end plate can be reduced by applying the pressure load between the end plate 43 and the blades 44 in the axial direction or between the end ring 45 and the blades 44 in the axial direction, and the operation for firmly adherence the weld surfaces together can be reliably achieved. Moreover, since the angle of inclination α of the first blade weld surfaces 53g, 53h, 53i, 53j with respect to the plate weld surfaces 47a is 2.5 degrees or less, and the angle of inclination β of the second blade weld surfaces 56e, 56f with respect to the ring weld surfaces 48a is 2.5 degrees or less, it is possible to reduce the gaps that may form between the first blade weld surfaces 53g, 53h, 53i, 53j of the blades 44 and the plate weld surfaces 47a of the end plate 43 or between the second blade weld surfaces 56e, 56f and the ring weld surfaces 48a of the end ring 45 without the orientation of the blades 44 being greatly changed by the angles of inclination, and the operation for firmly adherence the weld surfaces together can be reliably achieved.

Thus, with the blades 44 constituting the blower 4 of the present embodiment, it is possible to achieve an operation for reducing the gaps that may form in the axial direction between the first blade weld surfaces 53g, 53h, 53i, 53j of the blades 44 and the plate weld surfaces 47a of the end plate 43 or between the second blade weld surfaces 56e, 56f and the ring weld surfaces 48a of the end ring 45 in a reliable manner and without the orientation of the blades 44 being greatly changed by the angles of inclination.

(C) With the blades 44 constituting the blower 4 of the present embodiment, when the pressure load is applied in the axial direction between the blades 44 and the end plate 43 or the end ring 45 as the blades 44 are fixed by laser welding to the end plate 43 or end ring 45, there are sometimes cases in which the axially compressing load is applied to the blades 44, the blades 44 bend, and the axially central portions of the blades 44 protrude orthogonally to the axial direction (to the right of the paper surface in FIGS. 19(a)-(c)), in cases in which, e.g., the blades 44 are given a complex rounded shape (see FIGS. 4 and 19(a)-(c)). Therefore, the portions of the first blade weld parts 53 or the second blade weld parts 56 on the side substantially opposite the side in which the axially central portions of the blades 44 protrude orthogonally to the axial direction (the portions near the blade covers 61 in this case) are thereby inclined in a direction aparting from the axial direction with respect to the plate weld surfaces 47a or the ring weld surfaces 48a, and the gaps between the first blade weld surfaces 53g, 53h, 53i, 53j and the plate weld surfaces 47a or between the second blade weld surfaces 56e, 56f and the ring weld surfaces 48a tend to increase.

However, with the blades 44 constituting the blower 4 of the present embodiment, the first blade weld surfaces 53g, 53h, 53i, 53j or the second blade weld surfaces 56e, 56f are inclined so as to be closer to the plate weld surfaces 47a or the ring weld surfaces 48a as the blade weld surfaces are oriented in a direction (to the left of the paper surface in FIGS. 19(a)-(c)) substantially opposite a direction (to the right of the paper surface in FIGS. 19(a)-(c)) in which the axially central portions of the blades 44 are protruded orthogonally to the axial direction by the bending of the blades 44. Therefore, it is possible to maintain a state in which the gaps are small between the portions in the first blade weld surfaces 53g, 53h, 53i, 53j or second blade weld surfaces 56e, 56f of the blades 44 on the sides substantially opposite to the sides in which the axially central portions of the blades 44 protrude orthogonally to the axial direction, and the plate weld surfaces 47a of the end plate 43 or the ring weld surfaces 48a of the end ring 45. It is also possible to achieve satisfactory adherence between the first blade weld surfaces 53g, 53h, 53i, 53j of the blades 44 and the plate weld surfaces 47a of the end plate 43, or between the second blade weld surfaces 56e, 56f of the blades 44 and the ring weld surfaces 48a of the end ring 45, and the welding strength can be achieved in a stable manner.

(D) The blades 44 constituting the blower 4 of the present embodiment are configured by attaching the blade covers 61 to the blade bodies 51, wherein the first blade weld parts 53 are formed so as to extend from the ends of the blade bodies 51 near the end plate 43 toward the blade covers 61, and the second blade weld parts 56 are formed so as to extend from the ends of the blade bodies 51 near the end ring 45 toward the blade covers 61. Therefore, when the pressure load is applied in the axial direction between the blades 44 and the end plate 43 or end ring 45 as the blades 44 are fixed by laser welding to the end plate 43 or end ring 45, the portions of the first blade weld parts 53 near the blade covers 61, which are less rigid than the portions near the blade bodies 51, are inclined in the axial direction away from the plate weld surfaces 47a, and the gaps between the first blade weld surfaces 53g, 53h, 53i, 53j and the plate weld surfaces 47a tend to increase. The aforementioned portions of the first blade weld parts are also inclined in the axial direction away from the ring weld surfaces 48a, and the gaps between the second blade weld surfaces 56e, 56f and the ring weld surfaces 48a tend to increase.

However, with the blades 44, since the first blade weld surfaces 53g, 53h, 53i, 53j are inclined so as to be closer to the plate weld surfaces 47a as the first blade weld surfaces are oriented toward the blade covers 61, it is possible to maintain a state in which the gaps are small between the portions of the first blade weld surfaces 53g, 53h, 53i, 53j of the blades 44 near the blade covers 61 and the plate weld surfaces 47a of the end plate 43. It is also possible to achieve satisfactory adherence between the first blade weld surfaces 53g, 53h, 53i, 53j of the blades 44 and the plate weld surfaces 47a of the end plate 43, and the desired welding strength can be achieved in a stable manner. On the side near the end ring 45, since the second blade weld surfaces 56e, 56f are inclined so as to be closer to the ring weld surfaces 48a as the second blade weld surfaces are oriented toward the blade covers 61, it is possible to maintain a state in which the gaps are small between the portions of the second blade weld surfaces 56e, 56f of the blades 44 near the blade covers 61 and the ring weld surfaces 48a of the end ring 45. It is also possible to achieve satisfactory adherence between the second blade weld surfaces 56e, 56f of the blades 44 and the ring weld surfaces 48a of the end ring 45, and the welding strength can be achieved in a stable manner.

(E) With the blades 44 constituting the blower 4 of the present embodiment, in cases in which unevenness occur in each of the weld surfaces due to the finishing precision during resin molding of the blades 44, the end plate 43, and the end ring 45, merely providing an incline to the first blade weld surfaces 53g, 53h, 53i, 53j or the second blade weld surfaces 56c, 56f gives rise to the danger that there will still be portions in which it is impossible to reduce the gaps between the first blade weld surfaces 53g, 53h, 53i, 53j of the blades 44 and the plate weld surfaces 47a of the end plate 43, or between the second blade weld surfaces 56e, 56f of the blades 44 and the ring weld surfaces 48a of the end ring 45. However, with the blades 44, first grooves 53d, 53e, 53f are formed in the first blade weld parts 53, and second grooves 56b, 56c, 56d are formed in the second blade weld parts 56, whereby the parts of the first blade weld parts 53 and the parts of the second blade weld parts 56 partitioned by these grooves are able to move as separate portions in the axial direction, with the grooves acting as boundaries (see FIGS. 20(a)(b) and 21(a)(b)). Therefore, it is possible to reduce the danger that there will still be portions in which it is impossible to reduce the gaps between the first blade weld surfaces 53g, 53h, 53i, 53j of the blades 44 and the plate weld surfaces 47a of the end plate 43, or between the second blade weld surfaces 56e, 56f and the ring weld surfaces 48a of the end ring 45. It is also possible to achieve satisfactory adherence between the first blade weld surfaces 53g, 53h, 53i, 53j of the blades 44 and the plate weld surfaces 47a of the end plate 43 and between the second blade weld surfaces 56e, 56f of the blades 44 and the ring weld surfaces 48a of the end ring 45, and the welding strength can be achieved in a stable manner.

In cases in which the blades 44 are made to bend by the pressure load in the axial direction between the blades 44 and the end plate 43 or end ring 45 as the blades 44 are fixed by laser welding to the end plate 43 or end ring 45, such as cases in which the blades 44 are given a complex rounded shape in order to improve blowing performance or noise quality, or cases in which the blades 44 are thinned in order to reduce the weight of the impeller, there may be portions in which the gaps increase between first blade weld surfaces 53g, 53h, 53i, 53j of the blades 44 and the plate weld surfaces 47a of the end plate 43 or between the second blade weld surfaces 56e, 56f of the blades 44 and the ring weld surfaces 48a of the end ring 45. Therefore, merely providing an incline to the first blade weld surfaces 53g, 53h, 53i, 53j or the second blade weld surfaces 56e, 56f gives rise to the danger that there will still be portions in which it is impossible to reduce the gaps between the first blade weld surfaces 53g, 53h, 53i, 53j of the blades 44 and the plate weld surfaces 47a of the end plate 43, or between the second blade weld surfaces 56c, 56f of the blades 44 and the ring weld surfaces 48a of the end ring 45. However, in this case, as with the case described above, first grooves 53d, 53e, 53f are formed in the first blade weld parts 53, and second grooves 56b, 56c, 56d are formed in the second blade weld parts 56, whereby the parts of the first blade weld parts 53 and the parts of the second blade weld parts 56 partitioned by these grooves are able to move as separate portions in the axial direction, with the grooves acting as boundaries (see FIGS. 20(a)(b) and 21(a)(b)). Therefore, even in cases in which the blades 44 are made to bend by the pressure load in the axial direction between the blades 44 and the end plate 43 or end ring 45, it is possible to reduce the danger that there will still be portions in which it is impossible to reduce the gaps between the first blade weld surfaces 53g, 53h, 53i, 53j of the blades 44 and the plate weld surfaces 47a of the end plate 43, or between the second blade weld surfaces 56e, 56f and the ring weld surfaces 48a of the end ring 45. It is also possible to achieve satisfactory adherence between the first blade weld surfaces 53g, 53h, 53i, 53j of the blades 44 and the plate weld surfaces 47a of the end plate 43 and between the second blade weld surfaces 56e, 56f of the blades 44 and the ring weld surfaces 48a of the end ring 45, and the welding strength can be achieved in a stable manner.

Thus, with the blades 44 of the present embodiment, not only are inclines provided to the first blade weld surfaces 53g, 53h, 53i, 53j and the second blade weld surfaces 56e, 56f, but also first grooves 53d, 53e, 53f and second grooves 56b, 56c, 56d are formed, and the welding strength can therefore be achieved in a stable manner.

(F) With the blades 44 constituting the blower 4 of the present embodiment, second blade flat surfaces 56g, 56h, which are parallel to the ring weld surfaces 48a and which are disposed at positions axially farther away from the ring weld surfaces 48a than the portions of the second blade weld surfaces 56e, 56f in proximity to the ring weld surfaces 48a (the portions near the blade covers 61 in this case), are formed in the second blade weld parts 56 so as to be adjacent to the second blade weld surfaces 56e, 56f in a state in which the second blade weld parts 56 are disposed to face the ring weld surfaces 48a in the axial direction, and the second grooves 56b, 56c, 56d are formed so as to correspond to the boundaries between the second blade weld surfaces 56e, 56f and the second blade flat surfaces 56g, 56h, whereby the portions corresponding to the second blade weld surfaces 56e, 56f of the second blade weld parts 56 partitioned by the second grooves 56b, 56c, 56d and the portions corresponding to the second blade flat surfaces 56g, 56h are able to move as separate portions in the axial direction, with the second grooves 56b, 56c, 56d acting as boundaries (see FIGS. 21(a)(b)). When the pressure load is applied between the end ring 45 and the blades 44, the pressure load can be reliably concentrated in the portions of the second blade weld surfaces 56e, 56f closer to the ring weld surfaces 48a than the second blade flat surfaces 56g, 56h, because only the portions of the second blade weld parts 56 corresponding to the second blade weld surfaces 56e, 56f are moved axially by the pressure load, and the portions corresponding to the second blade flat surfaces 56g, 56h do not move readily in the axial direction. Therefore, when the blades 44 are fixed by laser welding to the end ring 45, the pressure load applied between the end ring 45 and the blades 44 can be further reduced.

Figure 22:
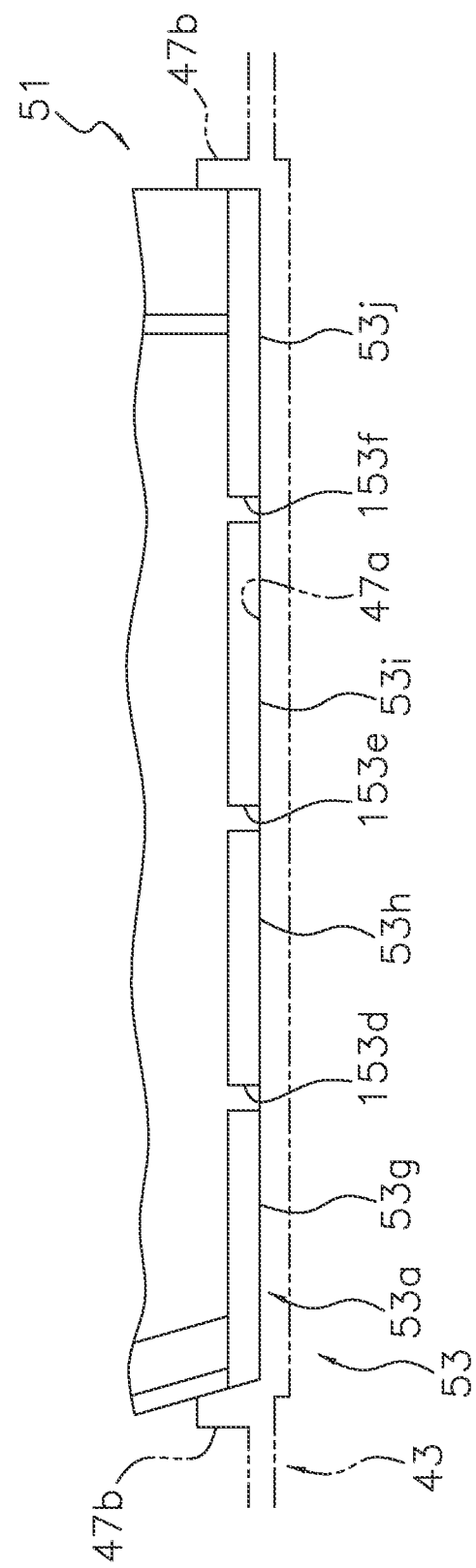
FIG. 22 is a view showing an example in which first slits are formed in the first blade weld parts instead of the first grooves, and is a drawing equivalent to FIG. 13.
Figure 23:
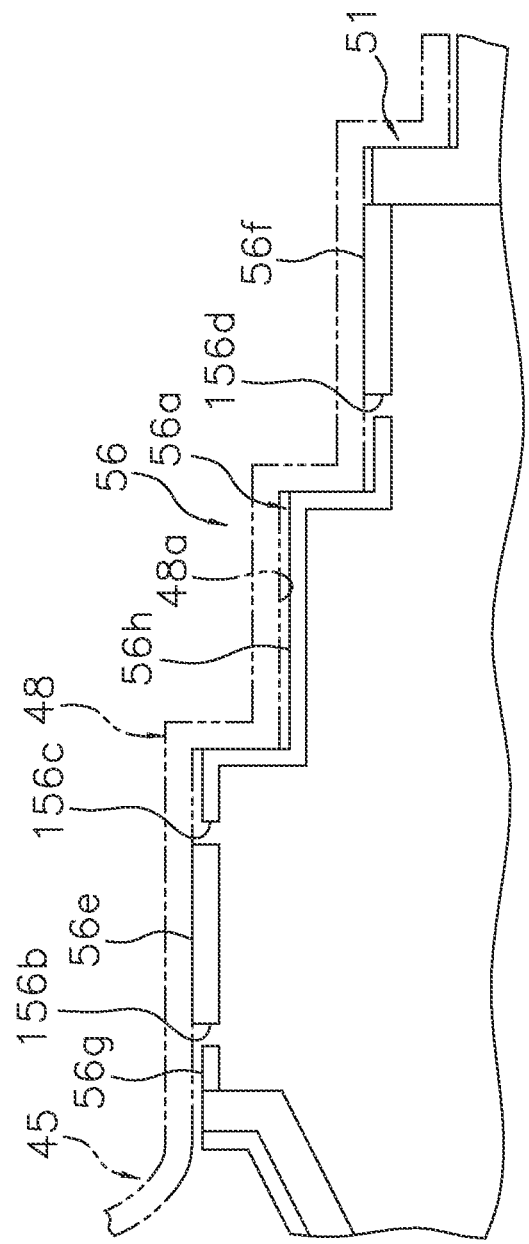
FIG. 23 is a view showing an example in which second slits are formed in the second blade weld parts instead of the second grooves, and is a drawing equivalent to FIG. 14.

In the present embodiment, first grooves 53d, 53e, 53f are formed in the first blade weld parts 53, and second grooves 56b, 56c, 56d are formed in the second blade weld parts 56 in order to allow the first blade weld parts 53 and the second blade weld parts 56 to move axially as described above, but, instead of these grooves, first slits 153d, 153e, 153f may be formed in the first blade weld parts 53, and second slits 156b, 156c, 156d may be formed in the second blade weld parts 56, as shown in FIGS. 22 and 23. It is possible to allow the first blade weld parts 53 and the second blade weld parts 56 to move axially as described above in this case as well.

(5) In the embodiment described above, in order to improve the adherence between the weld surfaces when the first blade weld parts 53 or second blade weld parts 56 of the blades 44 are laser welded to the plate weld surfaces 47a of the end plate 43 or the ring weld surfaces 48a of the end ring 45, the first blade weld surfaces 53g, 53h, 53i, 53j of the first blade weld parts 53 are inclined with respect to the plate weld surfaces 47a, and the second blade weld surfaces 56e, 56f of the second blade weld parts 56 are inclined with respect to the ring weld surfaces 48a (see FIGS. 10 through 12). However, another option is to incline the plate weld surfaces of the end plate 43 with respect to the first blade weld surfaces 53g, 53h, 53i, 53j of the first blade weld parts 53, and to incline the ring weld surfaces of the end ring 45 with respect to the second blade weld surfaces 56e, 56f of the second blade weld parts 56, as shown in FIGS. 24 through 26.

Figure 24:
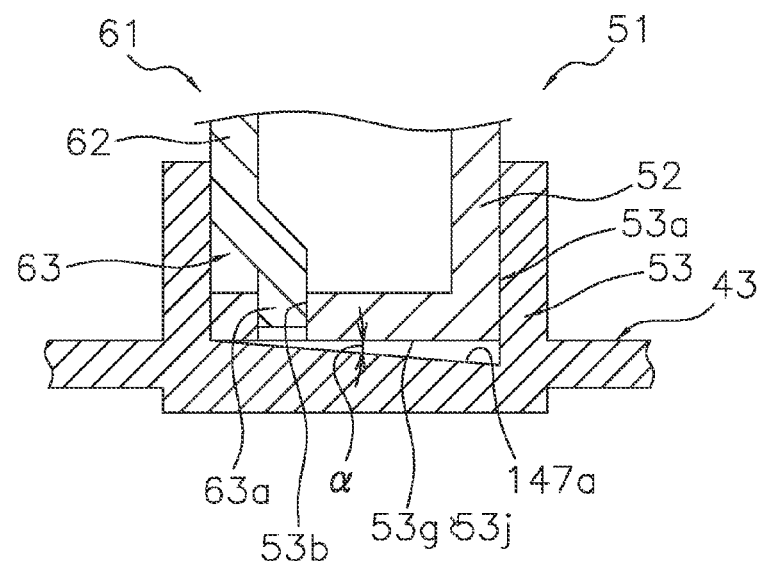
FIG. 24 is a view showing an end plate and a first blade weld part according to a modification, and is a drawing equivalent to FIG. 10 (the end plate is indicated by solid lines).

FIG. 24 is a view showing a modification in which a plate weld surface 147a of an end plate 43 is inclined with respect to first blade weld surfaces 53g, 53h, 53i, 53j of a first blade weld part 53. This case presents a state in which the first blade weld part 53 is disposed to face the plate weld surface 147a in the axial direction, wherein the first blade weld surfaces 53g, 53h, 53i, 53j of the first blade weld part 53 are made to be parallel to a plane orthogonal to the rotational axis line O-O of the impeller 42, and the plate weld surface 147a is inclined so as to be closer to the first blade weld surfaces 53g, 53h, 53i, 53j as the plate weld surface is oriented toward the blade cover 61. In this case as well, the portions of the first blade weld surfaces 53g, 53h, 53i, 53j in proximity to the plate weld surface 147a (the portions near the blade cover 61 in this case) are firmly pressed into the plate weld surface 147a. As a result, satisfactory adherence can be achieved between the first blade weld surfaces 53g, 53h, 53i, 53j and the plate weld surface 147a, and the blade 44 can therefore be fixed to the end plate 43 with high welding strength. The angle range in the embodiment described above can be applied for this angle of inclination α as well. Furthermore, as in the embodiment described above, forming first grooves 53d, 53e, 53f (see FIG. 13) or first slits 153d, 153e, 153f (see FIG. 22) in the first blade weld part 53 makes it possible to achieve the same effects as in the embodiment described above in which the first grooves or first slits are formed.

Figure 25:
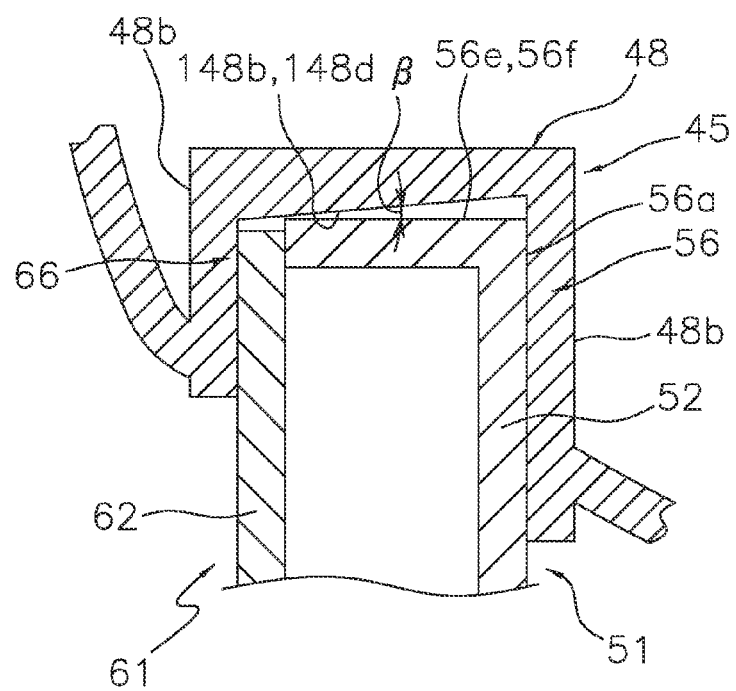
FIG. 25 is a view showing an end ring and a second blade weld part according to a modification, and is a drawing equivalent to FIG. 11 (the end ring is indicated by solid lines).
Figure 26:
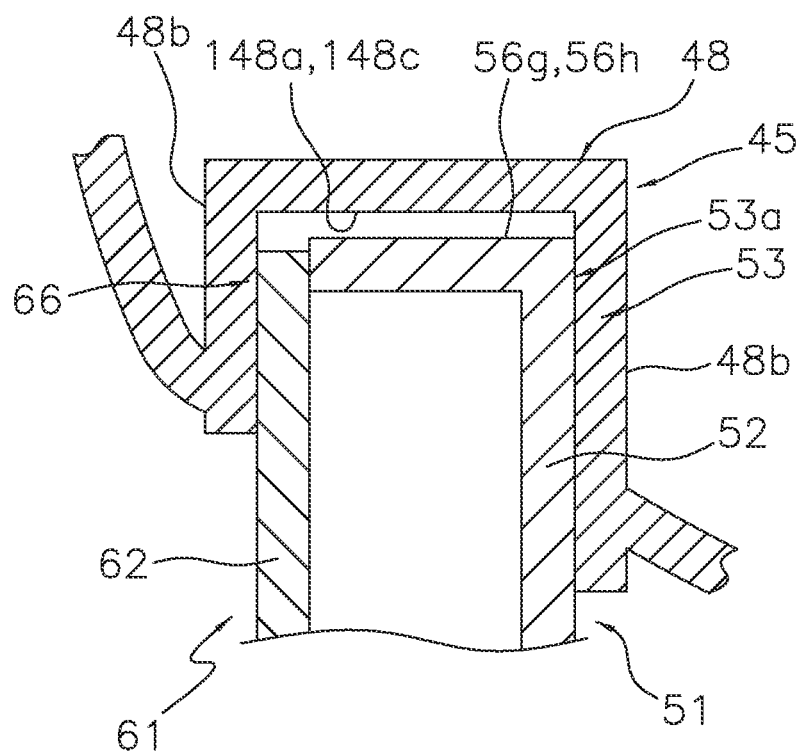
FIG. 26 is a view showing an end ring and a second blade weld part according to a modification, and is a drawing equivalent to FIG. 12 (the end ring is indicated by solid lines).

FIGS. 25 and 26 are drawings showing a modification in which a ring weld surface 48a of an end ring 45 is inclined with respect to second blade weld surfaces 56e, 56f of a second blade weld part 56. This case presents a state in which the second blade weld part 56 is disposed to face the ring weld surface in the axial direction, wherein the second blade weld surfaces 56e, 56f and second blade flat surfaces 56g, 56h of the second blade weld part 56 are made to be parallel to a plane orthogonal to the rotational axis line O-O of the impeller 42, and ring weld surfaces 148b, 148d are inclined so as to be closer to the second blade weld surfaces 56e, 56f as the ring weld surfaces approach the blade cover 61. The ring weld surfaces 148b, 148d are disposed at positions that are opposite the second blade weld surfaces 56e, 56f in the axial direction, and ring flat surfaces 148a, 148c are formed in the other portions, i.e., at positions that are opposite the second blade flat surfaces 56g, 56h (see FIG. 26). In this case as well, the portions of the second blade weld surfaces 56e, 56f in proximity to the ring weld surfaces 148b, 148d (the portions near the blade cover 61 in this case) are firmly pressed into the ring weld surfaces 148b, 148d. As a result, satisfactory adherence is achieved between the second blade weld surfaces 56e, 56f and the ring weld surfaces 148b, 148d, and the blade 44 can therefore be fixed to the end ring 45 with high welding strength. The angle range in the embodiment described above can be applied for this angle of inclination β as well. Furthermore, as in the embodiment described above, forming second grooves 56b, 56c, 56d (see FIG. 14) or second slits 156b, 156c, 156d (see FIG. 23) in the second blade weld part 56 makes it possible to achieve the same effects as in the embodiment described above in which the second grooves or second slits are formed.

INDUSTRIAL APPLICABILITY

In an impeller for a centrifugal blower configured by using laser welding to fix resinous blades having hollow spaces formed in interiors thereof to a resinous blade-supporting rotator, using the present invention makes it possible to achieve satisfactory adherence between the weld surface of the blade and the weld surface of the blade-supporting rotator, and the welding strength can be achieved in a stable manner.

What is claimed is:
1. A method of manufacturing an impeller for a centrifugal blower comprising:
preparing a blade-supporting rotator that is resinous to rotate around a rotational axis, the blade-supporting rotator having rotator weld parts including rotator weld surfaces formed on one side surface in the axial direction;
disposing a plurality of resinous blades annularly around the axis, the plurality of resinous blades having hollow spaces formed in the blade interiors,
the blades having blade weld parts on which are formed blade weld surfaces inclined with respect to the rotator weld surfaces in a state in which the blade weld parts are disposed to face the rotator weld surfaces in the axial direction;
applying an axial pressure load to opposite axial ends of the blade-supporting rotator so as to compress the blades in the axial direction such that the blade weld surfaces are no longer inclined with respect to the rotator weld surfaces; and
fixing the blade weld surfaces to the rotator weld surfaces by laser welding, the blade weld parts being disposed to face the rotator weld surfaces in the axial direction.
2. The method of manufacturing an impeller according to claim 1, wherein
each blade weld surface is inclined at an angle of 0.5 degrees to 2.5 degrees with respect to a respective one of the rotator weld surfaces prior to the applying of the axial pressure load.

3. The method of manufacturing an impeller according to claim 2, wherein
prior to the applying of the axial pressure load, each blade weld surface is inclined to be closer to the respective one of the rotator weld surfaces as the blade weld surface is oriented in a direction substantially opposite a direction in which an axially central portion of the blade protrudes orthogonally in the axial direction by bending the blade during the applying of the axial pressure load.
4. The method of manufacturing an impeller according to claim 3, wherein
each of the plurality of blades has a first blade surface part, and a second blade surface part attached to the first blade surface part to form the hollow space with the first blade surface part, wherein
each blade weld part is formed to extend from the blade-supporting rotator side end of the first blade surface part toward the second blade surface part, and
each blade weld surface is inclined to be closer to the respective one of the rotator weld surfaces as the blade weld surface is oriented toward the second blade surface part prior to the applying of the axial pressure load.
5. The method of manufacturing an impeller according to claim 4, wherein
a groove or slit is formed in each blade weld part.
6. The method of manufacturing an impeller according to claim 4, wherein
each of the plurality of blades has a blade flat surface configured and arranged to be parallel to the respective one of the rotator weld surfaces and disposed at a position axially farther away from the rotator weld surface than the portion of the blade weld surface in proximity to the rotator weld surface, the blade flat surface being formed in the blade weld part in addition to the blade weld surface to be adjacent to the blade weld surface in a state in which the blade weld part is disposed to face the rotator weld surface in the axial direction, and
a groove or slit is formed to correspond to a boundary between the blade weld surface and the blade flat surface.
7. A method of manufacturing an impeller for a centrifugal blower comprising:
preparing a blade-supporting rotator that is resinous to rotate around a rotational axis, the blade-supporting rotator having rotator weld parts including rotator weld surfaces formed on one side surface in the axial direction;
disposing a plurality of resinous blades annularly around the axis, the plurality of resinous blades having hollow spaces formed in the blade interiors, the blades having blade weld parts on which are formed blade weld surfaces;
the rotator weld surfaces being inclined with respect to the blade weld surfaces in a state in which the rotator weld parts are disposed to face the blade weld surfaces in the axial direction;
applying an axial pressure load to opposite axial ends of the blade-supporting rotator so as to compress the blades in the axial direction such that the rotator weld surfaces are no longer inclined with respect to the blade weld surfaces; and
fixing the blade weld surfaces to the rotator weld surfaces by laser welding, the blade weld parts being disposed to face the rotator weld surfaces in the axial direction.

8. The method of manufacturing an impeller according to claim 7, wherein
the rotator weld surfaces are inclined at an angle of 0.5 degrees to 2.5 degrees with respect to the blade weld surfaces prior to the applying of the axial pressure load.

9. The method of manufacturing an impeller according to claim 7, wherein
prior to the applying of the axial pressure load, the rotator weld surfaces are inclined to be closer to the blade weld surfaces as the rotator weld surfaces are oriented in a direction substantially opposite a direction in which axially central portions of the blades protrude orthogonally in the axial direction by bending the blades during the applying of the axial pressure load.

10. The method of manufacturing an impeller according to claim 7, wherein
the blades include first blade surface parts, and second blade surface parts attached to the first blade surface parts to form the hollow spaces with the first blade surface parts,
the blade weld parts are formed to extend from the blade-supporting rotator side ends of the first blade surface parts toward the second blade surface parts, and
the rotator weld surfaces are inclined to be closer to the blade weld surfaces as the rotator weld surfaces are oriented toward the second blade surface parts prior to the applying of the axial pressure load.

11. The method of manufacturing an impeller according to claim 7, wherein
a groove or slit is formed in each of the blade weld parts.

12. The method of manufacturing an impeller according to claim 7, wherein
a rotator flat surface is formed in each of the rotator weld parts in addition to the rotator weld surface to be adjacent to the rotator weld surface in a state in which the rotator weld parts are disposed to face the blade weld surfaces in the axial direction, the rotator flat surfaces being parallel to the blade weld surfaces and being disposed at positions axially farther away from the blade weld surfaces than the portions of the rotator weld surfaces in proximity to the blade weld surfaces, and
a groove or slit is formed in each of the blade weld parts to correspond to a boundary between the rotator weld surfaces and the rotator flat surfaces.

* * * * *